United States Patent [19]
Picazo, Jr. et al.

[11] Patent Number: 5,432,907
[45] Date of Patent: Jul. 11, 1995

[54] NETWORK HUB WITH INTEGRATED BRIDGE

[75] Inventors: Jose J. Picazo, Jr., San Jose; William E. Steels, Sunnyvale, both of Calif.

[73] Assignee: Network Resources Corporation

[21] Appl. No.: 881,931

[22] Filed: May 12, 1992

[51] Int. Cl.⁶ .............................. H04J 3/02
[52] U.S. Cl. .................. 395/200; 370/85.12; 370/85.13; 370/85.14; 364/242.94; 364/242.95; 364/242.96; 364/DIG. 1
[58] Field of Search ............... 370/85.12, 85.13, 85.14; 395/200

[56] References Cited

U.S. PATENT DOCUMENTS

| | | | |
|---|---|---|---|
| Re. 33,426 | 11/1990 | Sugimoto et al. | 370/85.14 |
| 4,627,052 | 12/1986 | Hoare et al. | 370/88 |
| 4,825,435 | 4/1989 | Amundsen et al. | 370/97 |
| 4,901,312 | 2/1990 | Hui et al. | 370/85.12 |
| 4,922,503 | 5/1990 | Leone | 370/85.13 |
| 4,982,400 | 1/1991 | Ebersole | 370/85.15 |
| 5,060,228 | 10/1991 | Tsutsui et al. | 370/85.13 |
| 5,088,032 | 2/1992 | Bosack | 395/200 |
| 5,114,453 | 5/1992 | Morrow | 370/85.13 |
| 5,179,554 | 1/1993 | Lomicka et al. | 370/85.13 |
| 5,214,646 | 5/1993 | Yacoby | 370/85.14 |
| 5,251,213 | 10/1993 | Videlock et al. | 370/85.12 |
| 5,299,195 | 3/1994 | Shah | 370/85.6 |
| 5,301,303 | 4/1994 | Abraham et al. | 395/500 |
| 5,329,618 | 7/1994 | Moati et al. | 395/200 |

Primary Examiner—Christopher B. Shin
Attorney, Agent, or Firm—Ronald Craig Fish; Falk, Vestal & Fish

[57] ABSTRACT

A hub circuit with an integrated bridge circuit carried out in software including a switch for bypassing the bridge process such that the two bridged networks effectively become one network. An in-band management process in software is disclosed which receives and executes network management commands received as data packets from the LANs coupled to the integrated hub/bridge. Also disclosed is hardware and software to implement an isolate mode where data packets which would ordinarily be transferred by the bridge process are not transferred except in-band management packets are transferred to the in-band management process regardless of which network from which they arrived. An out-of-band to in-band management process receives network management commands and executes them or forwards them in-band to whatever device to which they are addressed.

37 Claims, 6 Drawing Sheets

NETWORK HUB WITH INTEGRATED BRIDGE

BACKGROUND OF THE INVENTION

The invention pertains to the field of networks for communications between computers, and, more specifically, to improvements in hubs for such networks.

Networks serve the purpose of connecting many different computers or terminals to each other, host computers, printers, file servers etc. so that expensive computing assets, programs, files and other data may be shared among many users. Communication protocols and standards for networks developed quickly to standardize the way in which data packets were sent across the data exchange media of the network. Several protocols have developed for networks including Ethernet TM, Token Ring TM, FOIRL and FDDI, the latter two being adapted for fiber optic physical media carrying the signals.

The physical media first used on Ethernet were thick coaxial cables, and a standard called 10Base5 was developed for assuring multivendor compatibility between components in thick coax, mix and match networks where network components from different vendors were used. These thick coax lines were bulky, expensive and hard to work with. Later, thinner coax Ethernet was developed, and, as an alternative to coax, unshielded twisted pair wires were used for the physical media. A vendor compatibility standard called 10Base-T developed for twisted pair media.

Networks have their own hardware and software to interface with the physical media that carry the signals, and the network software must interface with the operating system software. Computers communicate with each other using a set of rules called a protocol. A group of protocols, all related to the same model are called a protocol suite. To encourage open systems, a common model called OSI was developed by the International Standards Organization. OSI engendered a protocol suite which allows computers of all sizes and capabilities the world over to communicate using a common set of rules.

The OSI model has seven layers of software, each of which makes different functionality available to computers communicating using this model. Each layer in the model deals with specific computer-communication functions.

The Physical Layer is the lowest layer and specifies the rules for transmission of signals across the physical media. Hubs, also known as repeaters, have multiple connections to this physical media called pods. The purpose of a hub is to receive data packets from one port and repeat these packets, i.e., retransmit them on every other port connected to the hub according to whatever protocol, e.g., Ethernet, etc., which is in use.

The Data Link layer deals with transmission of data between devices on the same network. In addition to describing how a device accesses the physical media, this layer also provides some measure of error detection and control. Local Area Network (LAN) technologies such as Ethernet, Token Ring and FDDI operate at this layer. Data link addresses are implemented at this layer, and provide each device connected to the network a unique identifier by which packets may be sent to it. Bridges, which are devices which aid in forwarding data packets from one network segment or one network to another, operate at the Data Link layer.

The Network Layer deals with transfer of data between devices on different networks. The Network Layer adds the notion of network addresses which are specific identifiers for each intermediate network between a data source and a destination. Routers, which are devices which assist in transferring data packets from one network to another, operate at the Network Layer.

The remaining layers, called the higher layers, are the Transport Layer, Session Layer, Presentation Layer and Application Layer. These layers deal with communication between message source and message destination. The transport layer manages the transfer of data from a source program to a destination program. Process addresses, which identify specific "processes", i.e., computer programs, are implemented at this layer. Gateways operate at these higher OSI layers.

Within the OSI model, the user presents data through application programs to the highest layer. This data is then passed downward through the hierarchy of layers with each layer adding addressing and/or control information. When the data reaches the physical layer, it is sent to a device.

Conversely, received data is passed up through the layers with each layer stripping address or control information.

One way to think of a protocol is a common language by which computers may communicate, but a more accurate way is as a set of rules by which data is communicated between identical OSI layers.

There are other communication protocols beside the OSI Model. These include TCP/IP, XNS, IPX, AppleTalk, DECnet and SNA. Each of these protocols has its own layer model. For example, TCP/IP collapses network functionality into only 4 layers, while AppleTalk has 6 layers.

All network media have a limitation on the maximum volume of traffic that may be carried based upon the bandwidth imposed by the physical characteristics of the media. Ethernet bandwidth is 10 Megabits/second. This acts a limit on the traffic volume and can limit the number of computers, which may be connected to a single "segment" of a network. A segment is section of a network connected to a group of machines which may communicate with each other via repeater operations without having to traverse a bridge or router. Bridges and routers are useful in that they allow connections of multiple segments such that more computers may communicate with each other than would otherwise be possible given the limited bandwidth of the media.

Each bridge and router requires certain other peripheral circuitry to support it such as LAN controllers, a CPU, a power supply, a network management process, memory to store bridge source and destination address tables and various other things like status registers etc. Likewise, repeaters require many support circuits many of which are the same support circuits needed by bridges and routers. Further, bridges, routers and repeaters or hubs require initialization to set them up for operations, and they require initial installation labor to set them up properly to operate in a particular network configuration. In addition, each type machine is subject to network management considerations, assuming an intelligent hub. An intelligent hub is one which collects statistics about traffic flow through its ports, can electronically turn ports on and off and which provides error correction and detection services. Intelligent bridges, routers and hubs supply status information upon request from network management processes and can respond to network management commands, such as shut off a particular port.

In the prior art, bridges and routers were separate circuits from hubs and this created needless duplication of many peripheral circuits which were common between hubs and bridges and which could be shared. This needless duplication cost more and provided more points of failure. For example, if the bridge power supply failed or the CPU crashed, all machines on the two network segments on either side of the bridge would be cut off from each other.

Typically, a bridge is connected to a hub by a separate local area network segment which itself requires two port interface circuits such as LAN controllers and AUI's (generic network interfaces) with appropriate port drivers adapted for the specific media used for the bridge-hub LAN segment. This bridge-hub LAN segment represents an additional expense, requires management and provides additional points of failure which could disable the network. An intelligent hub coupled to a bridge or router by a separate LAN segment then requires three different device addresses for management message traffic, and creates more possibility for a network failure in multiplying the number of points of possible failure.

Another drawback of separate bridge/router and hub circuits is that bridge/routers do not usually include a mode where the bridge/routing function can be bypassed. The ability to bypass the bridge/routing function provides flexibility in network growth as small networks do not need bridging functions until the maximum network traffic volume starts to exceed the available network bandwidth. The ability to selectively bypass the bridge/routing function gives a network designer the ability to design a small network which has a built in capacity to grow larger without adding new components and improves the ability to troubleshoot the network.

Integrated hubs and bridges existed as option cards for concentrator chassis at the time this patent application was filed. One example of such a device is the Penril 2530 concentrator card with full performance bridging although it is not currently known whether this device qualifies as prior art because the copyright date of the literature on this device is dated the same month as the filing date of this patent application. The Penril Module 2530 10BaseT concentration and bridging card for the Penril 2500 series concentrator combines a hub and bridge which operates at all times on the same printed circuit board. The design of the Penril 2500 concentrators were for large networks. The 2530 card slides into a card slot on the 2500 series concentrator which can also service a plurality of such cards. The concentrator frame is believed to contain certain shared features such as power supply etc. and has a local, internal LAN segment that couples all the repeater/bridge cards together so that they can send data back and forth between them. The repeater on each card can be coupled to up to 25 machines on the network segment connected to that card and the integrated bridge continuously bridges the network segment coupled to a particular card to the internal LAN segment such that a machine coupled to a LAN segment coupled to card 1 can send a packet to a machine coupled to a LAN segment coupled to card 2 via the bridge on card 1, the internal LAN segment of the concentrator, the bridge on card 2 and the repeater on card 2. No distributed management functionality is integrated on either card 1 or 2. That management functionality is placed on a third card which is plugged into a different card slot. If the management card fails, the repeaters and bridges in cards 1 and 2 cannot be controlled. Likewise, if the internal LAN fails, user 1 cannot send data to user 2 or vice versa.

A concentrator structures like the Penril 2500 series is designed for large networks since to connect two external network segments, two cards are needed each of which can service up to 25 user machines. If the network has only 27 users, such a concentrator represents too big and complex of a structure to be affordable and justifiable.

Another problem with concentrators such as the Penril 2500 series is their lack of "stackability". The problem which prompts the need for a stackable network slice architecture is as follows. Suppose a particular building had 3 users on the ground floor and a group of 20 heavy users on the 4th floor or otherwise spaced away from the 3 users on the ground floor by a distance which is just under the maximum 10BaseT cable run permitted by the applicable Ethernet specification. The use of a concentrator requires that every one of the group of 20 users has his own twisted pair running from his machine back to the concentrator. The same is true for thick and thin coaxial cable installations. Such a configuration can be prohibitively expensive because a great deal of wire or coax must be used and the expense of installing all that wiring through the walls and ceilings can be large.

Now suppose that the distance to the group of 20 from the concentrator is larger than the maximum allowable cable run. In such a case, the complex wiring cannot be used, and if those users must be able to share resources with the 3 users on the ground floor, another concentrator must be purchased. Concentrators like the Penril are expensive. Typical costs today are in the neighborhood of $30,000 for the concentrator frame and about $6000 for each card.

A similar problem arises in large networks in big companies who may, for example, have a branch office in another state with only 6 users. If those users must share data or resources connected to the network at the parent company, they must be on the same network as the users at the parent company. With concentrator technology, the 6 users in the branch office must be connected to the concentrator at the parent company by a wide area network (WAN) connection. The Penril concentrator 2500 series has a card module (the 2540) which implements a WAN interface, but the 6 users in the branch office must also have a concentrator to plug their WAN interface card into. Therefore, the expense of having the tiny 6 user network segment remotely located is greater than it needs to be.

Thus, a need has arisen for an apparatus which can perform the functionality of bridges or routers and hubs without the aforementioned deficiencies, and which can overcome the aforedescribed difficulties with concentrator technology in smaller networks or large network will small satellite networks.

SUMMARY OF THE INVENTION

According to the teachings of the invention, a hub or repeater circuit which is initialized and managed by a microprocessor is integrated with a bridge or router which is integrated into the same system with the hub or repeater so that much of the circuitry that supports the hub can be shared by the bridge. In the preferred embodiment, the microprocessor which also serves to initialize and manages the hub or repeater circuitry executes an in-band management process in background and implements the bridge function by running a bridge software routine in foreground. In the preferred embodiment, the bridge process selectively couples two local area networks together designated network one and network two, and the bridge process can be shut off in a bypass mode such that the two network segments on either side of the bridge are merged into one large network segment. The one or more network segments coupled by the bridge may have different protocols such as Ethernet and Token Ring or FDDI in some embodiments. The hub serves as the network interface for network one for the bridge process, and a LAN controller and transceiver serve as the network interface for network two. Usually, network two is a backbone connection, but in some embodiments, it may be a wide area network (WAN) or another repeater and another LAN segment comprised of a plurality of transceiver cables coupled to the ports of the repeater. In a WAN embodiment, the LAN controller will be replaced with a WAN controller. In some embodiments, the bridge process selectively couples more than two networks, and in some embodiments, the bridge process is replaced by a router process. The bridge or router function may be performed in either hardware or software.

Dynamic random access memory is shared between the bridge process and two LAN controllers. One of the LAN controllers is coupled to the hub and the other is coupled to the bridge process. The LAN controller coupled to network two uses a transceiver to drive the physical media of network two.

In the preferred embodiment, the bridge software includes a bypass mode wherein the bridge function is bypassed and data packets presented at any port of network one to the repeater circuitry are repeated on all network one ports as in normal processing and are also repeated on an AUI port. This AUI port is coupled to network two through a software controlled switch to the transceiver used in the bridge mode to couple the bridge process to network two in some embodiments. This transceiver is therefore shared between the bridge and bypass modes. In the preferred embodiment, the AUI port on the network one hub or repeater is coupled in bypass or bridge modes to the network two media through a media access unit (MAU) in the form of a module which slides into or out of the AUI port thereby enabling different MAU's for different media types on network two to be easily exchanged when conditions demand a change in media type on the second network segment or backbone connection.

In an alternative embodiment, an "isolate" mode is also embodied in the hub/bridge system. In isolate mode, no packets are forwarded from network one to network two thereby effectively isolating these two networks from each other except for in-band management packets. In-band management packets are data packets containing commands, status inquiries etc. from the network manager to administer various aspects of network operation. In isolate mode, if an in-band management packet appears at either network interface, the bridge process selects this packet from the stream of data and forwards it to the input queue of an in-band management process carried out by the hub/bridge software. The isolate mode helps isolate problems on the network for faster troubleshooting.

In the preferred embodiment, forwarding Vectors are used to speed performance. These forwarding vectors are predetermined memory locations that contain pointer addresses pointing to separate bridge and bypass software routines. The bypass routine simply discards the packet because the repeater has already sent the packet out on network two through the AUI port. In the preferred embodiment, there are separate receive and transmit buffers in memory which are implemented by a linked list. The bypass process discards the packet by removing it from the receive buffer of the network from which it arrived by rearranging the pointers on the linked list to skip over the packet and either erasing the packet or informing a memory managing process that the block of memory locations consumed by the packet are available for other uses such as storing other packets.

In an alternative embodiment, a console command process executing in background in software receives out-of-band management commands from the network manager via a modem or a terminal connected to the integrated hub/bridge. The console command process executes any management messages addressed to the integrated hub/bridge by interacting appropriately with the hub, bridge process etc. Any management messages addressed to other hubs, bridges, routers etc. on any of the networks coupled together are written as data packets into the transmit buffer of the appropriate network which must be traversed to get to the destination machine.

An important aspect of the invention is in the "network slice" stackable architecture implemented by the integrated hub/bridge. This architecture is especially useful in small networks and to solve the problems noted above with concentrator technology. As the term is used herein, the genus of machines each of which may be referred to as a "network slice" is a stand-alone hub or repeater with 26 or fewer ports, having its own enclosure and user interface switches and indicator light, and having a built-in, i.e., integrated bridge to couple the repeater ports to a backbone, a local backbone or another repeater and LAN segment, and having distributed management, i.e., a collection of subroutines in the control software that can understand management commands and requests for data originated by a network administrator. One important species in this genus has "open architecture" while another important species utilizes a bypass mode wherein the bridge function is bypassed and the two LAN segments connected to either side of the bridge are connected together to form a single LAN. "Open architecture" means that certain national standard for network communication and management are implemented. The hub/bridge according to the teachings of the invention supports the known SNMP network management protocol and all the known national RFC's and MIB standards published by the IETF for repeaters, bridges, RS232 ports, MAUs, ethernet protocols, internet file transfer and other protocols and the IEEE 801.1(d) spanning tree, filtering by protocol algorithm.

By integration of a hub and bridge in the same package, circuitry can be shared so costs are reduced, a network link between a separate bridge and hub can be eliminated thereby further reducing costs and simplifying installation in that only one setup procedure need be performed instead of two, and points of failure are eliminated thereby improving reliability. For example, with separate bridge and hub boxes, if the bridge fails, the hub and the machines of network one are cut off from network two and the hub cannot be managed if the network manager is coupled on the network two side of the bridge. According to the teachings of the invention, this problem can be eliminated by bypassing the bridge. The bypass mode also gives more flexibility for network growth. Further, with the invention, both the bridge and hub functions can be managed by the network manager by messages to the same address which reduces in-band network management traffic.

Figure 1:
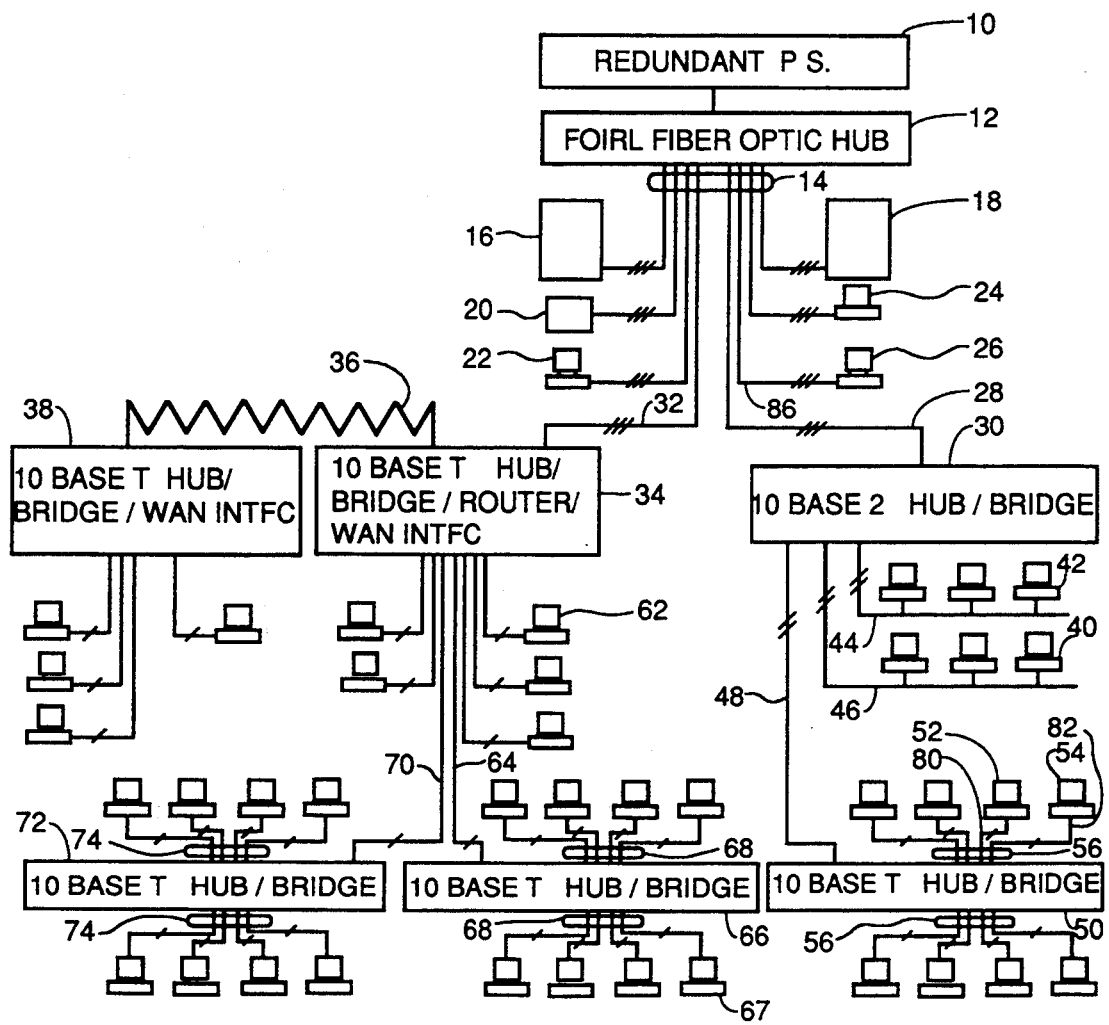
FIG. 1 is a block diagram of a typical network environment in which the teachings of the invention find utility.

DETAILED DESCRIPTION OF THE PREFERRED EMBODIMENT:

Referring to FIG. 1 there is shown a typical network installation in which the teachings of the invention find use. A redundant power supply 10 supplies a fiber optic hub 12 which has a plurality of fiber optic ports indicated generally at 14. Each of these ports is connected to a fiber optic physical data transmission media via a port driver circuit not shown. Each of the fiber optic media is indicated by a line with three slash marks through it. These media are coupled to mainframe computers 16 and 18, laser printer 20 and three personal computers 22, 24 and 26. Data transmitted to the fiber optic hub 12 by any of the computers is automatically repeated by repeater circuitry in the hub on all the other ports using the FOIRL Ethernet standard.

The fiber optic hub 12 is connected via a backbone pod connection 28 to a 10Base2 hub with integrated bridge 30. The fiber optic hub also has another port serving as a backbone connection 32 to a 10Base-T hub 34 with integrated high performance bridge/router and wide area network (WAN) interface 36. The wide area network interface can span great distances. In the example shown, the wide area network interface 36 couples the 10Base-T hub 34 to another 10Base-T hub 38 with an integrated high performance bridge and wide area network interface.

The 10Base2 hub 30 is connected to a number of computers of which computers 40 and 42 are typical. These connections are via coaxial line segments 44 and 46. Coaxial connections are shown in FIG. 1 by lines with two slash marks through them. The 10Base2 hub 30 is also connected via a coaxial backbone connection 48 to a 10Base-T hub with integrated bridge 50.

The 10Base-T hub 50 is connected via a plurality of repeater ports 56 to a plurality of computers of which computers 52 and 54 are typical. Any data packet entering the hub 50 from any one of the ports is automatically repeated on all the other repeater ports 56. The same type of repeating operation is carried out automatically by all of hubs 12, 30, 34, 38, 66 and 72.

A 10Base-T hub uses a physical layer communication protocol which is appropriate for a twisted pair of physical media. Twisted pair connections are shown in FIG. 1 by lines with single slashes through them. A 10Base2 hub repeats data packets on its ports using a physical layer protocol appropriate to coaxial cable.

The 10Base-T hub 34 has a plurality of repeater pods connected to a plurality of computers of which device 62 is typical. Hub 34 also has a twisted pair port connection 64 to another 10Base-T hub 66 which has an integrated bridge. Connection 64 is a backbone connection for hub 66. Hub 66 is connected to a plurality of computers of which computer 67 is typical via repeater ports 68.

Likewise, hub 34 is connected via a twisted pair pod connection 70 to the backbone port of another 10Base-T hub with integrated bridge 72. The hub/bridge 72 is connected to a plurality of computers via repeater pods 74.

As an example of how the integrated hub bridge circuits in FIG. 1 work, consider the following hypothetical data exchange transactions. Suppose that computer 52 wishes to send a data packet to computer 54. In this example, the data packet would enter the 10Base-T hub/bridge 50 via twisted pair line 80 and would be automatically repeated on all the repeater ports 56 including twisted pair line 82. Computer 54 would receive the packet as would all the other computers connected to hub/bridge 50. However, the packet would have a destination address indicating device 54 was the intended recipient such that other computers connected to the hub/bridge 50 would discard the packet.

In the preceding example, the bridge function in hub/bridge 50 would examine the destination address of the packet arriving via twisted pair 80 and check a forwarding table of network addresses which contains entries for various network addresses indicating whether those addresses are on network 1 or network 2. In the bridge mode of operation for hub/bridge 50, all of the repeater ports 56 are considered to be network 1 and the backbone connection 48 is considered to be network 2. The bridging function, in the preferred embodiment, is a learning bridge which builds the forwarding table as data packets arrive at the bridge from each source address. The bridging function knows which network a packet came from, and will make an entry in its table associating each source address with the network from which it came. Assuming that computer 54 had already sent a packet somewhere else, the bridging function would know that computer 54 was connected to network 1 and therefore would not forward the packet received from computer 52 to the network 2 via backbone connection 48. However, in the situation where computer 54 had not previously sent a packet, the bridging function in hub/bridge 50 would assume that computer 54 was connected to network 2, and would forward the packet to network 2 via backbone connection 48. However, since the packet would be automatically repeated on all repeater ports 56 anyway, computer 54 would still receive the packet via its repeater port even though the packet was also forwarded to network 2. Since computer 54 would send an acknowledgment message acknowledging receipt of the packet, the bridge function in hub/bridge 50 would then make an entry in its table indicating that computer 54 was coupled to network 1. Thereafter, further packets destined for computer 54 would not be forwarded by the bridge in hub/bridge 50 on the backbone 48.

Now suppose computer 52 wishes to send a packet to computer 42. In this case, the bridge function in hub/bridge 50 would not find an entry for computer 42 and would forward the packet received from network 1 via twisted pair 80 out on the coaxial backbone connection 48.

The backbone connection 48 for hub/bridge 50 is connected to a repeater port of 10Base2 hub/bridge 30. Therefore the packet arriving on coaxial line 48 is automatically repeated on coaxial lines 44 and 46, and would therefore arrive at computer 42.

To change the hypothetical slightly, suppose computer 52 wanted to send a packet to computer 26 connected to fiber optic hub 12. In this case, the bridging functions in hub/bridge 30 would read the destination address and may or may not find an entry for computer 26. In either eventuality, the bridge 30 would forward the packet received on coaxial line 48 out on fiber optic backbone connection 28. This backbone connection 28 is connected to one of the repeater ports of the fiber optic hub 12 and therefore would be repeated on all other repeater ports 14 thereof. In this manner the packet would be transmitted out on the repeater port connected to fiber optic media 86 and would arrive computer 26.

One of the advantages of integration of the hubs and bridges in the sample network of FIG. 1 is that it substantially reduces the cost of the network. This is, in part, because the hub/bridge integration eliminates much circuitry needed to couple each hub to a bridge with the associated LAN controllers and transceivers needed to do this. Network management traffic is also reduced because there are fewer network addresses of machines which must be addressed by network manager traffic. Typically a network manager will be coupled to one of the hub/bridges by a terminal and will address management commands to any of the network implementing circuits on the network. These commands will be forwarded as data packets to the proper hub/bridge etc. like other data packets, but will be taken off the network by the machine to which they are addressed and executed. By having fewer boxes that need to be managed and fewer addresses, this management traffic, which represents network overhead, is reduced.

Figure 2:
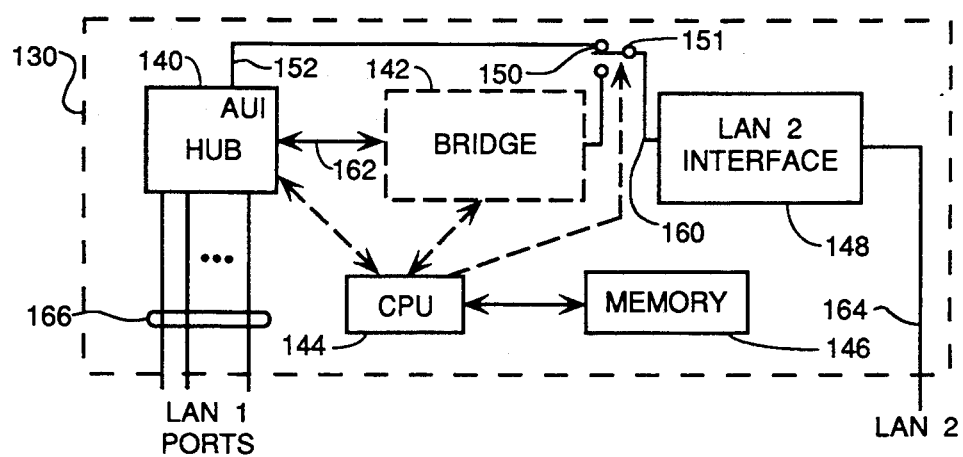
FIG. 2 is a block diagram of one embodiment of the invention employing the broad concept of integration of a bridge with a hub in the same package to share circuitry and eliminate points of failure which would exist if the bridge and hub were separate circuits.

FIG. 2 shows a highly simplified block diagram of an embodiment of the broad concept according to the teachings of the invention. The hub 140 and bridge process 142 are integrated in the same system and are supported by the same physical support structure and housed in the same housing. In addition, the hub and bridge functions share certain physical assets such as the CPU 144 and the memory 146. In a sense, the LAN 2 interface 148 is also shared, because in the bypass mode switch 150 is connected so as to couple an AUI port 152 of the hub 140 to LAN 2 through the LAN 2 interface 148. In bypass mode, LAN 1 and LAN 2 comprise a single local area network. Because the AUI port of the hub 140 cannot drive any physical media, the LAN 2 interface 148 is necessary to merge the machines coupled to LANs 1 and 2 into a single network even though the physical media of LAN 1 and LAN 2 may be different.

In the preferred embodiment, the bridge process 142 is a software process carried out by the central processing unit 144 using memory 146 and the bridging software routine described in flow charts given below and detailed in the source code appendix attached hereto. In other embodiments, the bridge 142 may be a hardware circuit which operates either autonomously or under the control of central processing unit 144. In either type embodiment, the hub and bridge functions will share the central processing unit and will be managed by the CPU implementing network management functions.

Bypass mode is useful for providing flexibility in network designs. It is most useful in planning for network growth where local area networks 1 and 2 may be connected together as single network when the level of network traffic is small enough such that the bandwidth limitations of the physical media do not impose a ceiling on the number of machines which may be connected. However, when the number of machines coupled to the network grows and the volume of traffic approaches 10 Megabits per second, the CPU 144 in FIG. 2 can alter the state of switch 150 such that the AUI port 152 is no longer coupled to bus 160 directly and bridge mode becomes active. When the bridge is active, because only traffic on bus 162 which has a destination address identifying a machine connected to local area network 2 will get through to LAN 2, the number of machines effectively sharing each network is substantially cut down. Thus, the amount of traffic on each network is cut down to a level which can be easily handled by the physical media.

Figure 3:
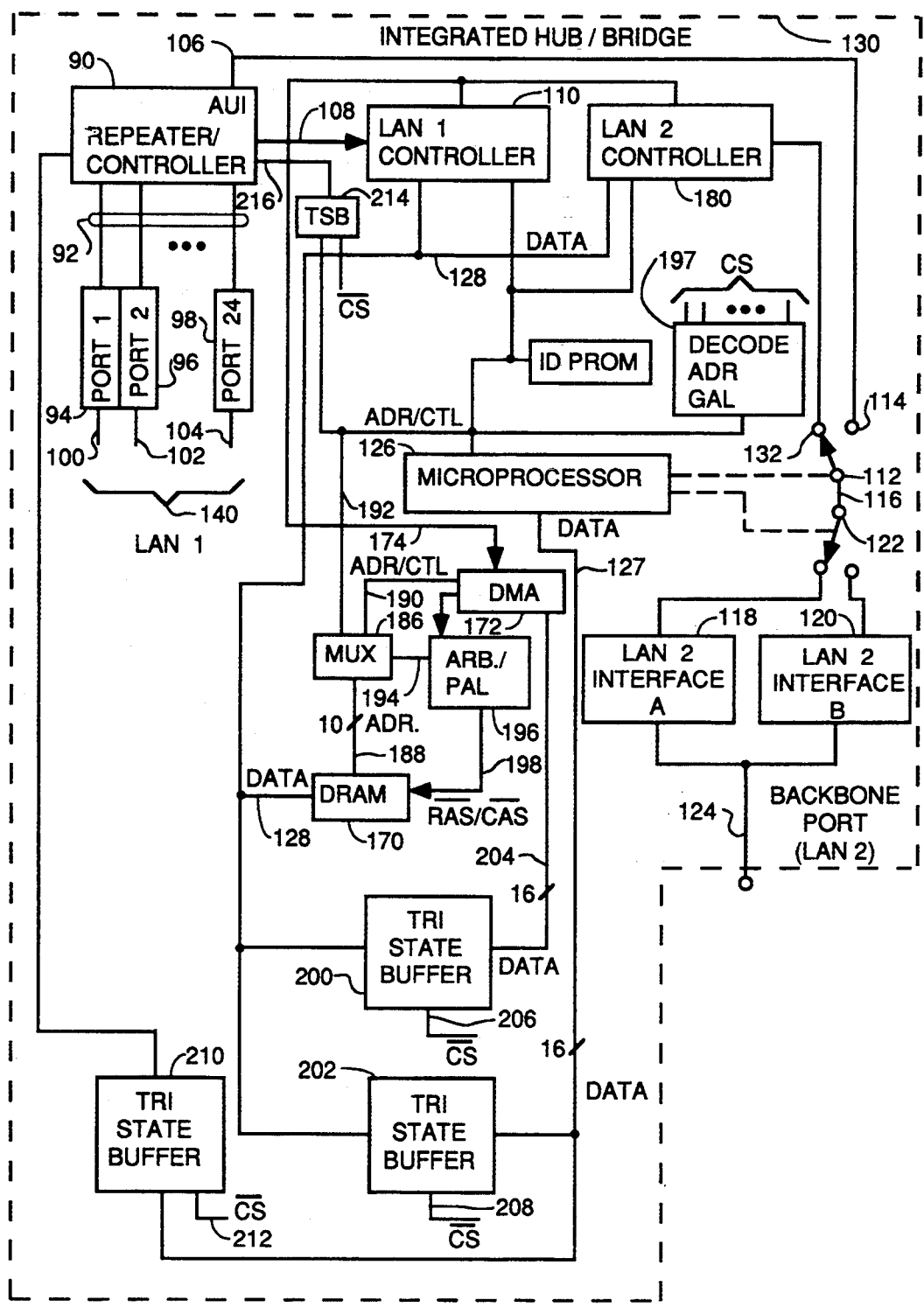
FIG. 3 is a block diagram of another embodiment of the invention with dual network two transceivers for fault tolerance.

Referring to FIG. 3, there is shown a block diagram of another embodiment of an integrated hub/bridge with redundant network two transceivers. A repeater/controller 90 has a plurality of repeater ports 92 each of which is coupled to a hub interface circuit such as the port 1 transceiver circuit 94, the port 2 transceiver circuit 96 or the port 24 transceiver circuit 98. Each of these port transceiver circuits interfaces between the network data link layer protocol implemented by the repeater/controller 90 and the particular physical layer protocol appropriate to the physical media being used to carry the data. The physical media is represented by lines 100, 102 and 104. The physical media may be unshielded twisted pair in the case of a 10Base-T hub, coaxial cable in the case of a 10Base2 hub, or fiber optic wave guides in the case of a 10BaseF or an FOIRL hub, etc. All of the examples given above are for the Ethernet network data link layer protocol, however the teachings of the invention are applicable to any network data link layer or physical layer protocol such as Token Ring, FDDI, etc. Further, the teachings of the invention are equally applicable to any communication model such as OSI and any transport layer protocol such as TCP/IP, XNS, IPX, AppleTalk, DECnet, and SNA.

Any data received through any one of the port interface circuits such as port 1 circuit 94 is automatically repeated by the repeater/controller 90 on all of the other ports 92. In addition, any received data packet is also repeated out an AUI port 106 and is also transmitted on a network one data bus 108 coupled to a LAN 1 controller 110. The AUI port 106 is a non-media specific port which can be coupled to a transceiver circuit which is appropriate to the particular physical media to be driven. The format of data packets and the collection of signal lines and signal definitions for an AUI port is set by a national standard in accordance with the particular communication data link layer protocol being used. However, the AUI port itself can drive a 50 meter AUI transceiver cable, but cannot drive the physical media of the network without a suitable network interface transceiver.

The AUI port 106 plays an important role in implementing a novel feature of some embodiments of the invention called bypass mode. In bypass mode the bridging function is bypassed, and the backbone port is treated as just another repeater port. In FIG. 2 this is physically implemented by connecting the AUI port 106 to a software controlled switch 112 in bypass mode. Switch 112 is set in bypass mode so as to connect terminal 114 to line 116. Line 116 can be coupled to the data input/output port of either of two LAN interfaces 118 and 120 through another switch 122. Switches 112 and 122 may be software controlled in some embodiments and manually operated in other embodiments.

The function of the selected LAN interface 118 or 120 is to drive whatever physical media is used for the backbone port connection 124 to network two. This backbone port physical media may be twisted pair, coaxial cable, fiber optic waveguide, etc. The purpose of having two LAN interfaces A and B is to provide fault tolerance redundancy such that if one fails, the other may be used. Both of the switches 112 and 122 are controlled by a microprocessor 126 in the preferred embodiment. This microprocessor is shared by all of the circuitry in the integrated hub/bridge 130. Normally, the microprocessor 126 will establish the position of software controlled switch 112 during an initialization phase at power-up time.

During initialization, data is written via data bus 127 to the repeater/controller 90 to set this device up for operation. The microprocessor 126 also reads data written by the user (or a front panel switch position in some embodiments) to determine whether bridge or bypass mode is desired. If bypass mode is desired, microprocessor 126 send a control signal to switch 112 so that terminal 114 is connected to line 116. If bridge mode is desired, switch 112 is controlled such that terminal 132 is coupled to line 116. Terminal 132 is coupled to a LAN 2 controller 180 which is driven by the bridge function carried out in software by microprocessor 126. LAN 2 controller is the network two interface for the integrated bridge.

The microprocessor 126 has multiple duties including: being shared by both the hub and bridge processes for initialization, on-line, in-band management and carrying out bridging duties in some embodiments although the bridge function could be carried out by separate circuitry in some embodiments. The microprocessor is only indirectly involved in the hub process since the repeater/controller 90 does the retransmission work without intervention by the microprocessor. The microprocessor can intervene in this process in executing management commands such as turning ports on or off and will report certain status data back to the network manager such as port polarity status, perport error rate etc.. In the bridge function however, the microprocessor plays a central role in executing the software that carries out the forwarding function.

In the bridging mode, data packets will be forwarded from local area network 1, 140, to local area network 2, 124, where appropriate, while in the bypass mode, local area network 1 and local area network 2 will be merged and will all be considered the same local area network by the hub.

The bridging function is carried out in the embodiment of FIG. 3 as follows. When a packet arrives from local area network 1, it is repeated on network one data bus 108 and received by LAN 1 controller 110. The LAN 1 controller 110 then cooperates with a DMA controller 172 to store the data packet in a receive buffer for network one in memory 170. At initialization time, the LAN controllers 110 and 180 are informed by the microprocessor 126 of the starting and ending memory locations of receive and transmit FIFO buffers in memory 170 for each of networks one and two. In some embodiments, the receive and transmit buffers are implemented as FIFO buffers using linked lists in memory 170. In other embodiments, separate FIFO memories could be used.

Since the microprocessor 126 also uses memory 170 to store the forwarding table entries for the bridging function, the data, address and control buses of the memory 170 must be shared between the DMA controller 172 and microprocessor 126. The details of how this bus sharing is carried out are not critical to the invention and any bus arbitration scheme will suffice for practicing the invention. In the preferred embodiment, when the LAN controllers receive packets, they request the DMA controller to store them, and the DMA controller requests bus arbitration PAL (programmable array logic) for access to the bus. If bus access is not immediately granted, the local area network controllers 110 and 180 can temporarily store data packets in internal buffers. When a data packet arrives and is stored in the receive buffer, an interrupt to the microprocessor is generated by the LAN controller which received the packet. This tells the microprocessor which network is the source of the packet and that the bridge process detailed below must be performed. The flow chart of FIGS. 5A and 5B below are the processing of an interrupt service routine which services the LAN controller interrupts in some embodiments.

The microprocessor 126 processes received data to be input to the bridging process by accessing memory 170 using a pointer to the received packet sent with the interrupt from the LAN controller. The microprocessor reads the destination address and consults the forwarding table. If the packet is to be forwarded, the microprocessor "deposits" the data packet in the transmit buffer corresponding to the appropriate network by rearranging the pointers on the linked list of that transmit buffer to point to the new data packet to be transmitted in sequence. The LAN controllers are continually requesting access to the memory buses through the DMA controller 172 and the arbitration PAL 196 to retrieve data packets from their respective transmit buffers. In the case of LAN controller 110, such packets are forwarded to the repeater/controller 90 via data bus 108 for repeating on all network one pods. In the case of the LAN 2 controller 180, these data packets are forwarded to the LAN 2 interface circuit 118 or 120 selected by switch 122 for transmission on the network 2 media.

The local area network controllers 110 and 180 manage pointers for their FIFO buffers so as to keep track of the addresses where the last message stored in the receive queue is located and the address of the next packet to be transmitted in the transmit queue and to keep the linked lists properly FIFO ordered.

Microprocessor 126 also establishes a management queue in the memory 170 where in-band management commands and requests are stored temporarily until a management process, running in background mode, can access and execute the desired function.

Arbitration logic 196 is used to grant access to the memory buses according to some appropriate access protocol. In some embodiments, the protocol might be first-come, first-served, while in other embodiments the access protocol may use some priority scheme as between the DMA device 172 and the microprocessor 126.

A multiplexer 186 under control of the arbitration PAL 196 selectively connects the address bus 188 of the memory 170 either to the address/control bus 190 of the DMA device 172 or the address/control bus 192 of the microprocessor 126 in accordance with a control signal on line 194. The arbitration logic 196 also generates the row address strobe and column address strobe signal (RAS*/CAS*) on line 198 so as to time division multiplex the bus 188 between 10 bits of row address and 10 bits of column address. The arbitration logic 196 is coupled to the microprocessor 126 address and control bus to receive input information by a connection not shown in FIG. 2.

Arbitration of the memory data bus is carried out through tri-state buffers 200 and 202. Tri-state buffer 200 selectively connects the data bus 204 of the DMA device to the DRAM memory data inputs 128 coupled to the LAN controller data outputs when a chip select signal on line 206 is true. Likewise, tri-state buffer 202 couples the data bus 127 of the microprocessor to the memory data inputs when a chip select signal on line 208 is true. These chip select signals are generated in some embodiments by an address decoder gate array 197 coupled to the microprocessor address bus. In other embodiment, they may be generated by arbitration/PAL logic 196 so as to control and arbitrate access to the DRAM data inputs as between the DMA device 172 and the microprocessor 126.

As in the case of the embodiment of FIG. 2, microprocessor 126 is shared by the hub function and the bridge function. Specifically, the microprocessor sends data to the repeater/controller circuit 90 at initialization time to set the circuit up for operation, sends data to it during operation to do certain things like turn pods on or off and receives data from the repeater/controller regarding status for purposes of replying to management inquiries regarding port status. Data is sent to and received from the repeater/controller 90 via the data bus 127 using a tri-state buffer 210. This tri-state buffer receives a chip select signal on line 312 generated by address decoder 197 or arbitration/PAL control logic 196. The address decoder or arbitration logic 196 also generates a chip select signal for a tri-state buffer 214 which gates the address/control bus 192 on the microprocessor through to the address and control inputs 216 of the repeater/controller circuit 90. Once the microprocessor has been granted control of these buses, data may be sent to the repeater/controller 90 to initialize it or to cause it to carry out certain management functions, or to receive status information therefrom in some embodiments. In the preferred embodiment, status information travelling from the repeater/controller 90 to the microprocessor is sent by the repeater through the LAN 1 controller.

In some embodiments, the bus arbitration logic may be eliminated altogether and separate memory circuits may be used for all entities which need random access memory.

Figure 4:
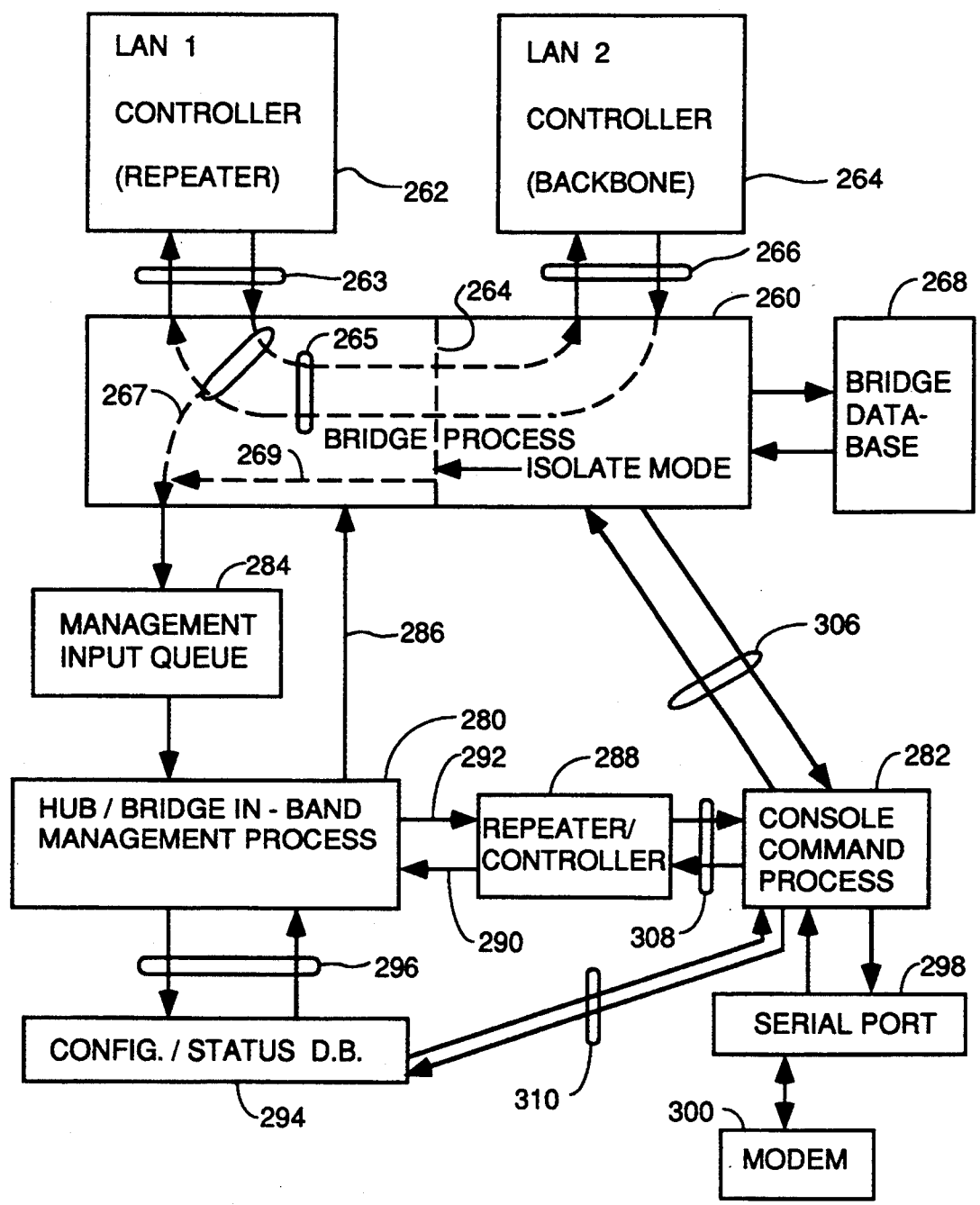
FIG. 4 is a data flow diagram illustrating the three software processes that are executed in the preferred embodiment, to perform bridging, in-band management and out-of-band management functions.

Referring to FIG. 4, there is shown a data flow diagram showing the data paths which exist between the three ongoing software processes of the preferred embodiment and several hardware and data structures which are involved therewith. In the preferred embodiment, a bridge process 260 is carried out in software in the foreground mode. As described above, the bridge process receives data from and sends data to a LAN 1 controller 262 via FIFO receive and transmit buffers in random access memory (not shown). This process is symbolized by arrows 263. Likewise, the bridge process sends data to and receives data from a LAN 2 controller 264 in a similar manner as symbolized by arrows 266. When the bridge process is active, i.e., when the hub/bridge is not in bypass mode, a bridge database 268 in random access memory is consulted for each incoming data packet. The purpose of consulting the bridge database is to determine whether or not the data packet should be forwarded to the other network controller. The bridge process will forward the data packet to another network controller other than the network controller from which the data packet was received if the bridge database 268 contains an entry indicating that the machine having the destination address of the data packet is not coupled to the network driven by the controller from which the data packet originated. If there is only one other network serviced by the bridge, the bridge process will forward the data packet to the network controller driving that other network. However, if the bridge process serves more than two networks, the bridge process will consult the bridge database to determine which network is coupled to the machine having the destination address of the data packet and forward the data packet to the appropriate network controller driving that network. Further, the bridge process will forward the data packet to another network controller if there is no entry in the bridge database indicating where the destination address lies.

The bridge database is built anew each time the machine is powered up. Therefore, while the bridge database is building, more packets will be forwarded to the other network controllers than are actually necessary until the bridge database contains entries for substantially all the destination addresses on the network serviced by the bridge process. However, in most protocols, each destination machine issues an acknowledgment message after it receives a data packet, and these acknowledgement messages will cause entries to be made in the bridge database if an entry for the source network address does not already exist. Therefore, an address will be put in the bridge database when the machine having that destination address either sends or receives the packet.

In some embodiments, the bridge database can be stored in non-volatile memory such as non-volatile RAM and the bridge process can cross-check the accuracy of the bridge database each time a packet is handled. That is, when a packet is received, the bridge database is checked for an entry for the destination address, and the packet will be forwarded if appropriate according to the above noted rules. However, if the acknowledgement message comes back through a different network controller than the network controller to which the packet was forwarded, the bridge process will realize that the machine having that destination address has been physically relocated to a different network segment, and will correct the bridge database entry for that destination address.

There are three basic types of bridges and various types of router processes known in the prior art. Any of these known bridge or router machines or software processes that carry out bridging or routing processes, when integrated with a hub so as to share certain common circuit elements are within the scope of the teachings of the invention. That is, the details of the bridge or routing process are not critical to the invention. Any known bridge or routing machine or software process will suffice.

All bridges provide network connections at the data link layer in the OSI model. The first type of bridge is a transparent bridge. This bridging function provides network connection to local area networks that employ identical protocols at the data link and physical layers. A transparent type bridge places no burden on the physical devices which are attempting to communicate. These devices take no part in the route discovery or selection process. From the device's point of view, it appears that all devices are resident on a single extended network with each device identified by a unique address. Processing by a transparent bridge can be summarized as follows:

(1) the bridge reads the data link layer destination addresses of all messages transmitted by devices on LAN 1;
(2) the bridge ignores all messages addressed to devices on LAN 1;
(3) the bridge accepts all messages addressed to devices on LAN 2, and, in the physical layer and data link layer protocols common to both networks, relays these messages to LAN 2
(4) the bridge performs identical functions for all messages transmitted on LAN 2.

Obviously such processing requires that the bridge acquires some knowledge of the location of devices. All this information could be manually configured in some embodiments, but in the preferred embodiment, a learning function is used to acquire device addresses.

The bridge learns addresses by reading the data link source address of each message that it receives.

In some embodiments, the forwarding table entries include a timer value that indicates the age of the observation.

The translating bridge is a specialized form of transparent bridge. This type bridge provides network connection services to local area networks that employ different protocols at physical and data link layers. For example a translating bridge would be used between a token ring protocol local area network and Ethernet protocol local area network.

A translating bridge provides connection services by manipulating the "envelopes" associated with each type of local area network. Processing performed by a translating bridge is relatively straightforward because the Ethernet, Token Ring and FDDI envelopes are somewhat similar. Each local area network type, however, sends message of different lengths. Because a translating bridge cannot fragment messages, each local area network device must be configured to transmit messages of the supportable length. For the example of a translating bridge being used between Token Ring and Ethernet networks, translating bridge processing can be summarized as follows:

1. The bridge, using the physical and data link layer protocols employed by LAN 1 (the Token Ring protocol), reads the data link layer destination addresses of all messages transmitted by devices on LAN 1.
2. The bridge ignores all messages addressed to devices on LAN 1.
3. The bridge accepts all messages addressed to devices on LAN 2 (the Ethernet protocol), and, using the physical data link protocols employed by LAN 2 relays these messages to LAN 2.
4. The bridge performs identical functions for all messages transmitted on LAN 2.

The second bridge type, an encapsulating bridge, is generally associated with so-called "backbone" topologies. In such a topology, several local area networks will be coupled by several bridges to a high volume backbone of such as a fiber optic FDDI protocol. A typical example of such a topology would be for Ethernet local area networks linked together by a high speed FDDI backbone. Each local area Ethernet network would be connected by an encapsulating bridge to the FDDI backbone. This would be necessary because the inter-network connection (the backbone) is coupled to networks that uses different physical and data link layer protocols.

Unlike translating bridges which manipulate the actual message envelope, encapsulating bridges place received messages within a backbone specific envelope (thus, the term encapsulating) and forward the encapsulated message to other bridges for eventual delivery to the message recipient. In the following example, four Ethernet networks are coupled to an FDDI backbone by four encapsulating bridges. The four bridges coupled to Ethernet networks 1 through 4 will all be referred to as bridge 1 through bridge 4. In the foregoing example, a message from a device on local area network 1 intended for a device on local area network 2 will be processed by an encapsulating bridge as follows:

1. The bridge coupled to local area network 1, using the physical and data link layer protocols employed by network 1 (Ethernet), reads the data link layer destination addresses of all messages transmitted by devices on network 1.
2. Bridge 1 ignores all messages addressed to devices on local area network 1.
3. Bridge 1 accepts all messages addressed to devices on other local area networks, places these messages within an FDDI specific envelope addressed to all bridges (such a collective address is called a multicast address), and sends this envelope across the FDDI backbone.
4. Bridge 3 receives the message, removes the outer envelope and checks the destination data link address. As the destination address is not local (the destination address is a device coupled to local area network 2) bridge 3 ignores the message.
5. Bridge 2 receives the message, removes the outer envelope and checks the destination data link address. As the address is local, bridge 2 uses Ethernet physical and data link layer protocol to forward the message to the destination device.
6. Bridge 4 receives the message, removes the outer envelope and checks the destination data link address. As the address is not local, bridge 4 ignores the message.
7. Bridge 1 strips the encapsulated message from the FDDI backbone.

The third type of bridge is called a source routing bridge. This term was coined by IBM to describe a method of bridging frames across Token Ring networks. Source routing requires that the message source (not the bridge) supply the information needed to deliver a message to its intended recipient.

Within a source routing network, bridges need not maintain forwarding tables. Rather they make the decision to forward or to drop a message solely on the basis of data contained within the message envelope. To implement such a scheme, each routing device determines the route to a destination through a process called route discovery. Route discovery can be accomplished in several ways.

One way is to implement a route discovery process using so-called "explorer packets." Each explorer packet has a unique envelope which is recognized by all the source routing bridges in a particular network configuration. When a device coupled to one local area network wishes to send a message to a device coupled to another local area network, the source device sends out an explorer packet which reaches one or more of the source routing bridges. Each source routing bridge adds its own name and the network connection from which the explorer packet was received in a section of the message envelope called the routing information field. Each source routing bridge then floods all of its network connections with copies of the packet.

Ultimately, the destination machine receives multiple copies of the explorer packet each of which has taken a different route through the network configuration. The route that each packet took can be traced from the information in the routing information field of each explorer packet.

The recipient machine then picks one of the packets for use either randomly or according to some criteria which is not critical to the invention such as the most direct route, and sends a response message back to the originator which lists the specific route to be used in communicating with that device. The source device then receives this message and records the route to be used in communicating with the destination device in a memory which stores routing information for each device for which a route has been discovered. Subsequent messages are enclosed in a different type of envelope which is recognized by source routing bridges. These bridges then consult their routing tables for the list of connections in bridges and forward the message based upon the routing information stored in memory.

Routers are different from bridges in that routers connect devices at the network layer of the OSI model. The connected networks may have different protocols at the data link and the physical layers. Routers actively select paths to use in connecting one device to another based on certain factors such as transmission costs, network congestion, transit delay or distance between the source and destination. Distance is usually measured in terms of the number of routers that must be traversed between the source and the destination. Routers are not transparent in that the devices which wish to use the services of a router must address their messages directly to the router.

Each local area network has a unique local area network address which is resident in the network layer of the OSI model. Likewise, each device on a local area network has its own address which is unique to that local area network. This is the data link layer address in the OSI model. A complete device address then in a routing environment will be either the addition or concatenation of the network layer and data link layer addresses.

Each source device, after preparing a message packet, compares the source address with the destination address and recognizes whether or not the message can be sent directly to the recipient on the network segment to which the source device is connected or whether the message must be routed. If the message must be routed, it is placed in an outer envelope with an address of the first router to which the message must be sent. The targeted router then opens the outer envelope and looks at the destination address. However, the router has multiple addresses in its routing table, one for each network connection to which it is coupled. If the router determines that the destination address is a device on one of the networks to which it is coupled, it sends the message directly to the appropriate network using the appropriate data link and physical layer communication protocols.

If the router is coupled, for example by a wide area network, to other routers, a router table is consulted. This table has entries in it each of which has a pair of data fields. The first field identifies a destination network and the second field identifies an adjacent router in the direction of that destination. A message which must be forwarded through another router will be forwarded by consulting this routing table and will be enclosed within an outer envelope and sent to the adjacent router "in the direction of", the destination address. This second router will open the envelope of the message when it is received, do a network address comparison and then forward the packet directly to the destination device.

Routers use routing protocols to exchange information about the network.

These routing protocols are software routines which run in the router. The exchange of information implemented by these routing protocols eventually causes the routing tables in all of the routers to converge so as to reflect the same network topology.

There are two types of routing protocols. The older type distance-vector protocol periodically issues broadcasts which propagate routing tables across the network. These routing protocols are useful mainly for small and relatively stable networks. Large and/or growing networks generally use data link-state protocol exemplified by the IS-IS routing protocol of the OSI model. Link state protocols send routing information only to reflect changes in the network topology. While distance-vector routing protocols always pick the path with the fewest number of routers between the source and the destination, link state protocols are different. Link state protocols can use multiple paths for failure recovery and load balancing of message traffic. Link state protocols also allow users to specify selection of routes according to delay, throughput, or reliability concerns.

Referring again to FIG. 4, the teachings of the invention also therefore encompass substitution of any of the known bridge types or a routing process for the bridge process symbolized by block 260. In the case of a router, routing tables would be substituted for the bridge database 268.

In some alternative embodiments, the microprocessor shared by the bridge functions also runs two background processes for management purposes. These background processes are symbolized by the hub/bridge in-band management process 280 and the console command process 282 in FIG. 4. The in-band management process 280 consists of a number of subroutines each of which is capable of carrying out a particular management function. These management functions are well-known to those skilled in the art and will not be detailed here nor are the details of the in-band management process critical to the invention. The teachings of the invention contemplate the fact that a single in-band management process may be shared by both the hub and the bridge functions and this management process is distributed in the sense that it is contained within the same housing as the integrated hub and bridge hardware so no failure between the network address of the hub/bridge circuitry and the network address of the management process can cause the hub/bridge circuitry to be uncontrolled. To implement one aspect of the "open system" architecture, the management process 280 conforms to the SNMP network management protocol selected as a national standard by the Internet Engineering Task Force (hereafter IETF). This means that other systems that have management software can also manage the integrated hub/bridge of the invention by sending SNMP management commands in via the modem 300, the serial port 298 and the console command process 282 and these commands will be understood by the hub/bridge in-band management process 280 and carried out. Further, under the SNMP network management protocol, every device connected to a network has data structures called MIBs which are unique to the product. MIBs effectively describe every "object", i.e., every controllable entity and some entities that are read only in a particular system and describes the various states that each entity can assume. The MIB data is used by SNMP management processes to control or read the objects thereby allowing management of the system described by the MIB data. To implement the open system architecture of the hub/bridge according to the teachings of the invention, the electronics and software of the hub/bridge 130 according to the genus of the invention implement in various species of the genus the following national open systems Internet and TCP/IP based standards: RFC 791 (Internet Protocol); RFC 792 (internet Control Message Protocol); RFC 793 (Transmission Control Protocol); RFC 768 (User Datagram Protocol); RFC 783 (Trivial File Transfer Protocol); RFC 826 (Address Resolution Protocol); RFC 854 (Telnet Services); RFC 903 (Reverse Address Resolution Protocol); RFC 1058 (Routing Information Protocol); RFC 1157 (Simple Network Management Protocol) RFC 1213 (MIB II); RFC 1286 (Bridge MIB); RFC 1317 (RS232-Like MIB); RFC 1368 (Repeater MIB); RFC 1398 (Ether-Like MIB); Draft RFC 802.3 MAU; IEEE Standard 802.1(d) Spanning Tree Algorithm, Filtering by Protocol. All the foregoing national standards are published by the IEEE and the IETF and are hereby incorporated by reference.

What the foregoing means is that the hub/bridge according to the teachings of the invention can be mixed into a network environment with equipment made by other manufacturers that support the same national standards and all the equipment will work together. Further, the invention contemplates that the bridge, hub and all other MIB descriptions are all integrated into one easily manageable entity such that installation is simplified in that the installer does not have to learn the complexities of the installation process for a hub and then learn the complexities needed for a separate bridge circuit installation also.

An important aspect of the invention is in the "network slice" stackable architecture implemented by the integrated hub/bridge. This architecture is especially useful in small networks and to solve the problems noted above with concentrator technology. Fundamentally, a "network slice" is a small, stand-alone repeater with integrated bridge and integrated management. More specifically, as the term is used herein, the genus of machines each of which may be referred to as a "network slice" is a stand-alone hub or repeater with 26 or fewer ports, having its own enclosure and user interface switches and indicator light, and having a built-in, i.e., integrated bridge to couple the repeater ports to a backbone, a local backbone or another repeater and LAN segment, and having distributed management, i.e., a collection of subroutines in the control software that can understand management commands and requests for data originated by a network administrator.

Network slices can solve the problems of concentrators noted in the background section of this application by allowing a network slice to be located out at the location of a group of users which is too small to justify having a dedicated concentrator. The network slice is substantially less expensive than a concentrator and can handle up to 26 users connected to each network segment on either side of the bridge so substantial pockets of physically isolated users can be handled relatively inexpensively. Network slices are "stackable" in that the individual network slices can each stand alone or work together to handle large networks via connections to each other over local "backbones", i.e., network 2 segments coupled to the integrated bridge which may have different physical media and protocols than the network one LAN segment coupled to the hub. This means that as the network grows in number of users, new network slices can be added in smaller increments than would be possible if concentrator technology was used, and this costs less. Thus, in the hypothetical situation posed in the background section of this application, the remote network slice located at the pocket of physically separated users can also send data to other network slices at the parent company or on a different floor via the single line of the local backbone connection. This can save substantially in installation costs by eliminating the need to run separate cables for each user from the physically isolated pocket of users back to the main concentrator. Of course, a local backbone LAN segment can be used only if the distance between the network slices is small enough to be less than the maximum allowable range for the media type used for the backbone connection. If the distance is larger than this maximum distance, the network 2 segment is replaced with a WAN transceiver (wide area network media access unit or MAU).

The fact that a network slice has on-board integrated management software means that the network slice can be remotely managed. This is a substantial advantage in a situation where a concentrator serves the main network but there is an isolated pocket of users which is too small to have to justify another concentrator but which need to share assets on the main network. With a network slice, the network administrator can run the management process on a work station coupled to the main network and send management commands and data requests either in-band over the backbone connection or via modem to the management process resident in the network slice located out with the isolated pocket of users. With a concentrator, this is not possible, because the management process is located on a card that must fit in a slot in the concentrator, so unless the isolated pocket of users has their own concentrator, the network segment they are on cannot be managed from the main network.

One important species in this "network slice" genus has "open architecture" while another important species utilizes a bypass mode wherein the bridge function is bypassed and the two LAN segments connected to either side of the bridge are connected together to form a single LAN. "Open architecture" means that certain national standard for network communication and management are implemented. The hub/bridge according to the teachings of the invention supports the known SNMP network management protocol and all the known national RFC's and MIB standards published by the IETF for repeaters, bridges, RS232 ports, MAUs, ethernet protocols, internet file transfer and other protocols and the IEEE 801.1(d) spanning tree algorithm with filtering by protocol. The bypass mode species is as previously described herein.

In the broadest species of the invention, the software executed by the microprocessor 144 of the bridge/hub 130 in FIG. 2 will implement an open architecture by implementing only the Internet Protocol defined by the national standard RFC 791 on the network layer of the ISO model. This specification is publicy available from the IETF and defines the network layer protocol used on Ethernet and defines, among other things, how destination network addresses and destination node addresses are used to route data packets to the appropriate machines on the LAN. This species of network slice would be a device which would not understand SNMP management commands.

There is a virtual necessity in the open systems market for network devices which can be managed from devices made by other manufacturers. The vehicle to achieve this interoperability is through open systems architecture and implementation of the SNMP management protocol. Therefore, an important species of the network slice genus of the invention is a network slice with open architecture. Such a machine includes, in the software executed by the microprocessor 144, routines which implement the SNMP (simplified network management protocol) defined in the national standard RFC 1157 specification published by IETF at the session and/or presentation layer of the ISO model. The SNMP protocol routines in the control software interface to the Internet Protocol on the network layer through software executable by microprocessor 144 which implements the User Datagram Protocol defined in the national standard RFC 768 published by the IETF.

Although open systems management requires SNMP management protocol to be implemented in the control program, the network slice genus does not require that the distributed, i.e., on-board management process be restricted to only understanding SNMP commands and requests. The network slice genus can also be managed directly via direct connection of the network administrator's computer to the RS232 port 298 in FIG. 4 or via a modem. In such an embodiment, it is necessary for the control program executed by the microprocessor 144 to have routines that implement the Console Command Process 282 in FIG. 4 to issue appropriate commands and requests for data to the bridge process 260 or the repeater/controller 288 via data paths 306 and 308, respectively. However, if management of the network slice is to be done "in-band" via packets sent over the Ethernet TM LAN, then the control software executed by the microprocessor 144 must include routines which implement the TELNET Services protocol defined by IETF in their national open systems standard RFC 854, the Transmission Control Protocol (TCP) defined by IETF in their national open systems standard RFC 793 as well as the Internet Protocol (IP) defined in RFC 791 along with the Internet Control Message Protocol (ICMP) defined in IETF national open systems standard RFC 792 and the Address Resolution Protocol (ARP) defined in RFC 826 as well as the Reverse Address Resolution Protocol (RARP) defined in RFC 903.

The way this all works together to allow in-band management of the network slice via a non-SNMP management process is as follows. When a management packet arrives at a repeater port, the physical layer hardware and software examines the MAC, i.e., Ethernet destination address thereof (which will be the MAC address of the bridge process) and causes the packet to be directed to the bridge process 260 in FIG. 4. From there the packet is directed to the in-band management queue 284 in FIG. 4 and ultimately is retrieved for processing by the hub/bridge in-band management process 280. This process 280 includes routines which implement the IP, ICMP, ARA, and RARA protocols previously mentioned. These protocols examine the data portion of the data link layer packet received from the port and derive the Destination Network Address and Destination Node IP addresses therein. The resulting data is then passed to the TCP protocol which converts the format of the data to text strings that the TELNET protocol can understand and converts the IP address to a port or socket address which is assigned to the hub/bridge in-band management process. The TELNET terminal emulator protocol then takes the data and converts it from its text string format to a line oriented format that can be understood by the Console Command Process 282 and passes the data to the non-SNMP Console Command Process 282 for execution in controlling the network slice. For data passing the other way, i.e., from the network slice hub/bridge to the remote non-SNMP management process in-band via the Ethernet physical media, the reverse sequence of events occurs. First, the TELNET protocol converts the line oriented strings of data that it receives from any object not of an SNMP type and converts that data into text strings that can be transported by the TCP/IP protocol. These strings must then converted to data link layer packets suitable for transmission on the Ethernet physical media by other routines in the control program executed by the microprocessor 144 that implement the TCP, IP, ICMP, and the RARA protocols. The protocols discussed in this specification are known to those skilled in the art and, with the exception of the xxx, xxx and xxx protocols, were implemented in the source code appendix filed with the parent of this patent application.

Other important species of the network slice genus allow remote upgrading of the software which the microprocessor 144 executes. In an open systems embodiment of a network slice with this capability, the software of the control program has routines which implement at the transport layer the Trivial File Transfer Protocol (TFTP) specified by IETF in the RFC 783 national standard. The TFTP Protocol interfaces with the physical media through the Internet Protocol on the network layer and the EtherTalk TM Link Access Protocol on the data link layer. This allows new and improved versions of the control program which controls processing by the microprocessor 144 to be loaded into the hub/bridge by the network administrator via a modem or in-band through whatever network path connects the network administrator's machine and the hub/repeater.

To understand the significance of the savings in network management traffic from combining the hub and bridge, some information about typical network management commands is helpful. Typical of management functions are to turn ports on and off, set protocol filtering, inquire regarding network traffic volume, inquire as to polarities status at each port, inquire as to the number of errors which are occurring on a particular port, analyzing traffic patterns on individual networks and across bridges, collecting data detected by the intelligent hub repeater circuits regarding errors and error types on a per-port basis, obtaining statistical data regarding the number of packets forwarded versus the number of packets received, configuring the repeaters via software commands, putting the bridge in bypass mode, etc.

The sole job of the hub/bridge in-band management process 280 is to receive so called in-band management commands and status inquiries and to process them. In-band management commands and inquiries are basically management messages which arrive like other data packets through one of the local area network controllers such as devices 262 or 264 in FIG. 4. This allows the network manager to manage components across the whole network while being connected to only one component thereof.

To implement the in-band management process, the bridge process 260 monitors data packet message traffic coming from the local area network controllers 262, 264 for any data packets having a destination address assigned to the integrated hub/bridge. These packets are forwarded to the in-band management process. These data packets are forwarded by placing them in a management input queue 284 implemented as a FIFO buffer in memory.

Typically the in-band management process runs in the background, so when a time slice is awarded to the management process or an in-band management interrupt occurs, the in-band management process 280 reads the next management command or inquiry in the input queue 284 and processes the management function appropriately. This process may involve sending protocol filtering commands to the bridge process 260 via data path 286 or collecting information from the repeater controller 288 via path 290. It may also involve sending commands to the repeated controller 288 via path 292. Likewise, it may involve writing data to a configuration/database 294, or obtaining information from that database as symbolized by data paths 296.

Out-of-band management is carried out by the background console command process 282 in some embodiments. Out-of-band management commands and status inquiries are commands received not as data packets from the LAN controllers but received directly from the network manager's terminal. In some embodiments, these commands are received via a serial port 298 which may be connected to a modem 300 or a terminal. In some embodiments, two serial ports may be used, one connected to a modem and one connected to a terminal. This allows a network manager to dial in via the telephone lines from a terminal at home and issue management status inquiries and network management commands via the modem 300. The network manager may also issue any of the network commands or status inquiries via a terminal 302 in his or her office.

The function of the console command process 282 is to receive these commands and status inquiries and interact appropriately with the repeaters, bridge process or configuration/status database to carry out the desired function. This interaction is carried out via data paths 306, 308 and 310. In the case where the management command is not addressed to the hub/bridge to which the network manager is directly connected, the console command process places the command in a data packet and places it in the transmit queue of the appropriate network controller so that it will eventually reach the destination component to be managed.

Figure 5A:
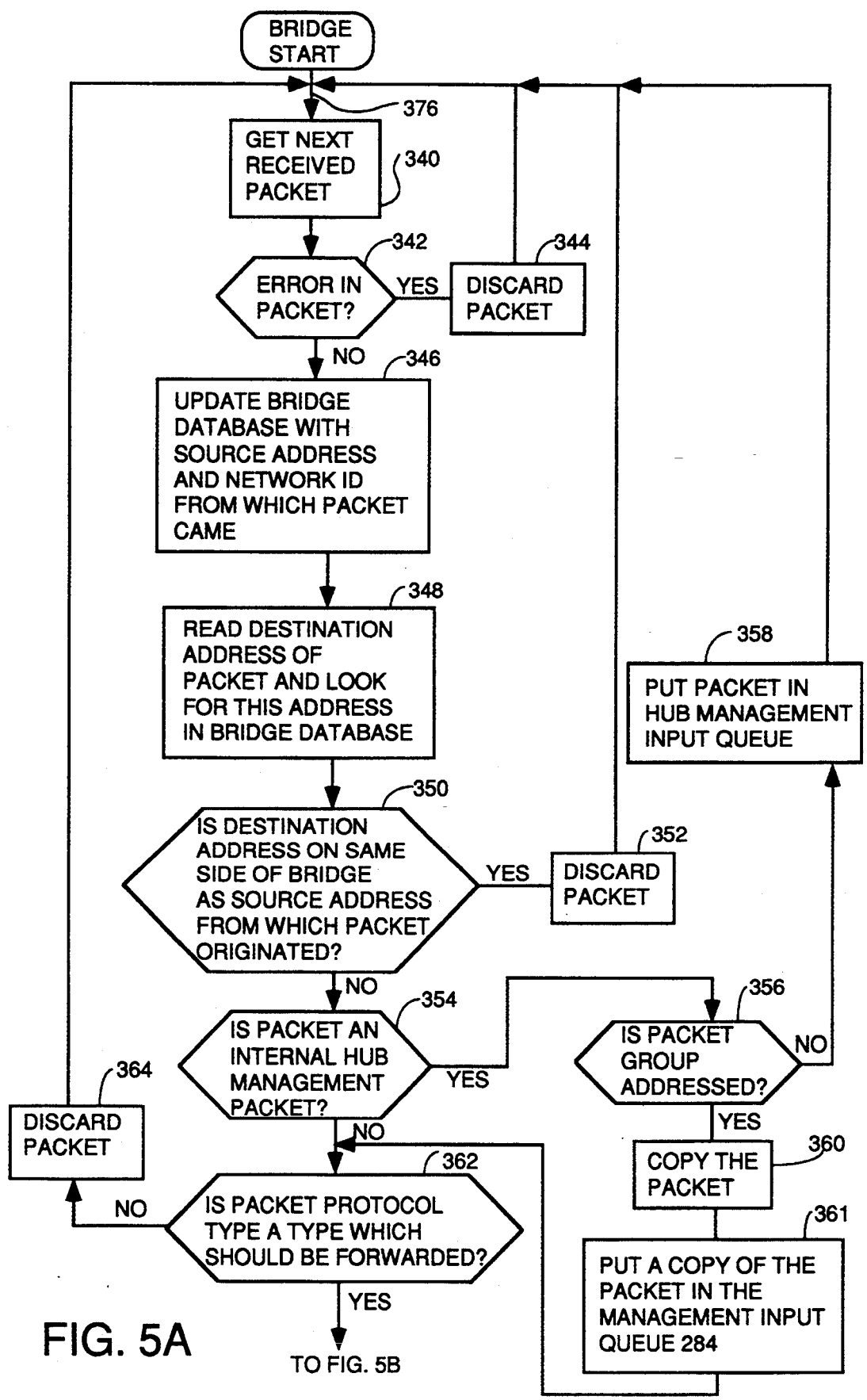
FIGS. 5A and 5B are a flow diagram of the processing of the bridge process illustrating operation of the forwarding vectors.
Figure 5B:
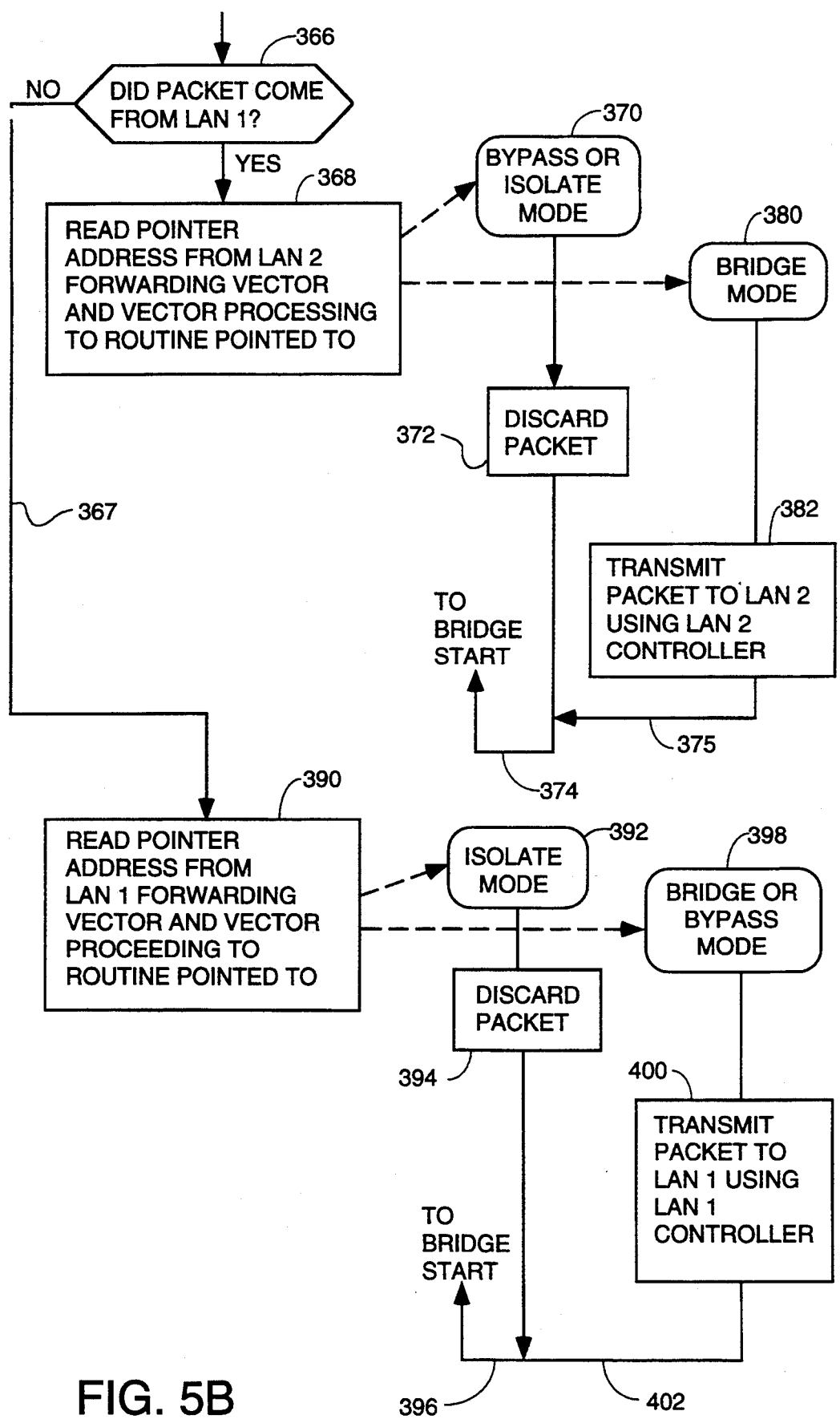

Referring to FIGS. 5A and 5B, there is shown a flow chart of the software bridge process used in the preferred embodiment. This process starts with the step symbolized by block 340 of getting the next received packet out of the FIFO receive buffer in memory after having received the interrupt from the LAN controller.

Next, the test of block 342 is performed to determine if there is any transmission error in the packet. If there is an error, the packet is discarded, as symbolized by block 344.

If there was no error, the process of block 346 is performed to update the bridge database. This is done by examining the source address of the packet and the network identification, i.e., the LAN controller, from which the packet came and writing this information into an entry into the bridge database forwarding table.

Next, the process of block 348 is performed to read the destination address of the packet and look for this address in the bridge database forwarding table.

The test of block 350 is then performed to determine if the destination address is on the same side of the bridge, i.e., on the same network, as the source address from which the packet originated. If the destination address is on the same side of the bridge as the source address, the packet is discarded as symbolized by block 352. The discard process involves rewriting the pointers on the linked list of the receive buffer to remove the discarded packet from the linked list.

Next, the destination address of the packet is read to determine if the destination address is the address which has been assigned to the integrated hub/bridge on which the bridge process is running. This process is symbolized by block 354 in FIG. 5A. If the packet is an internal hub management packet, then the test of block 356 is performed to determine if the packet is group addressed. In some protocols, the packets may be addressed to multiple network addresses with a single multicast or group address. If the packet is not a multicast packet, then the step symbolized by block 358 is performed to put the in-band management packet into the hub management input queue symbolized by block 284 in FIG. 4. Note that this monitoring process for in-band management data packets goes on even if the bridge is in bypass mode since there has been no step in the process shown in the flow chart of FIGS. 5A and 5B up to this point to determine whether the bridge is in bypass mode or bridge mode. Bypass mode is symbolized in FIG. 4 by the dashed lines 265. The process of filtering out in-band management packets for forwarding to the hub/bridge in-band management process while in the bypass mode is symbolized by dashed line 267 in FIG. 4. Also, note that FIG. 4 is somewhat deceptive in that the LAN 1 controller 262 is actually the network connection for the bridge to the network serviced by the repeated controller shown at 90 in FIG. 2 and 140 in FIG. 3. Conversely, the network segment "on the other side" of the bridge is symbolized by the network connection to the LAN 2 controller 263. LAN controller 263 services the backbone connection network segment. The physical media for this backbone connection is shown at 124 in FIG. 2 and 164 in FIG. 3. Note that in FIG. 4 there is no apparent data path between the repeater/controller 288 and the bridge process, but this data path does exist through the LAN 1 controller 262.

In an alternative embodiment, an isolate mode is implemented in the hub/bridge software. The purpose of this isolate mode is to cut off data packets from being forwarded between networks one and two. This helps isolate problems on the network for troubleshooting purposes. In isolate mode, the bridge process discards all incoming data packets from either network except in-band management packets such that no data packets get forwarded from one network to the other. In-band management packets get selected from the data stream and are placed in the input queue of the hub/bridge in-band management process 280. Thus the management of the network can continue during isolate mode to assist in the troubleshooting process. Isolate mode is symbolized by dashed barrier line 264 in FIG. 4, and the process of selecting in-band management packets for forwarding to the in-band management queue is symbolized by dashed line 269. The isolate mode can be implemented in any manner, but in the preferred embodiment of the integrated hub/bridge, it is implemented by setting the pointer addresses in the forwarding vectors to be described below to point to a packet discard routine. This is done in the initialization code in the preferred embodiment, but could be done at other times by the network manager in other embodiments. Further, in some embodiments, forwarding vectors need not be used, and the bridge process can, for example, check a status register having contents set by the user to determine the current mode of operation and then process the incoming packets accordingly.

Referring again to FIG. 5A, if the step of block 356 determines the packet is a multicast packet, then the step symbolized by block 360 is performed to copy the packet. After making a copy of the packet, the packet copy is placed in the input queue for the hub/bridge in-band management process as symbolized by block 361.

If the step of block 354 determines that the data packet is not an internal hub management packet, or the packet was a multicast hub management packet and was copied by block 360 and loaded in the management input queue, then the test of block 362 is performed. This test is to determine if the protocol of the packet is a protocol type for which a filter has been activated. An active filter condition indicates that the user does not desire packets with this communication protocol to be forwarded, even if the destination address is such that the packet would otherwise be forwarded. Protocol filtering is a feature of the bridging process which may be activated by the network manager either through an in-band management command or a out-of-band management command entered through the console command process symbolized by block 282 in FIG. 4. In some situations, it is desirable for example to prevent any Ethernet protocol packets from being forwarded from an Ethernet local area network on one side of the bridge to a Token Ring network or an FDDI backbone connection on the other side of the bridge. In this case, the network manager simply sets a protocol filter blocking any Ethernet data packets from being forwarded. This is the purpose of the test on block 362. If block 362 determines the packet should not be forwarded because it has a protocol which is being filtered out, then the step of block 364 is performed to discard the packet.

If the test of block 362 determines that the packet protocol is a type which is not being filtered, then the test of block 366 is performed to determine if the data packet came from the LAN 1 controller. If it did, the process of block 368 is carried out to read a pointer address from a LAN 2 forwarding vector. This pointer address is written during initialization of the integrated hub/bridge circuit by the microprocessor. The particular pointer address written into the memory location assigned to the LAN 2 forwarding vector will depend upon whether the user has indicated that the hub/bridge is to operate in the bypass mode, bridge mode or isolate mode. There is also a LAN 1 forwarding vector which is assigned a different memory location. The LAN 1 forwarding vector also stores a pointer address. This pointer address is also written during initialization time, and will point to a routine which carries out the desired processing of either the bypass mode, bridge mode or isolate mode. The user indicates in any known manner such as front panel switch positions which mode is desired. Thereafter, at initialization time, a pointer address appropriate to the selected mode is written into the LAN 1 and 2 forwarding vectors. The process of step 368 will read the LAN 2 forwarding vector and vector processing to block 370 if either bypass or isolate mode is selected, or to block 380 if bridge mode is selected.

Figures 6A, 6B:
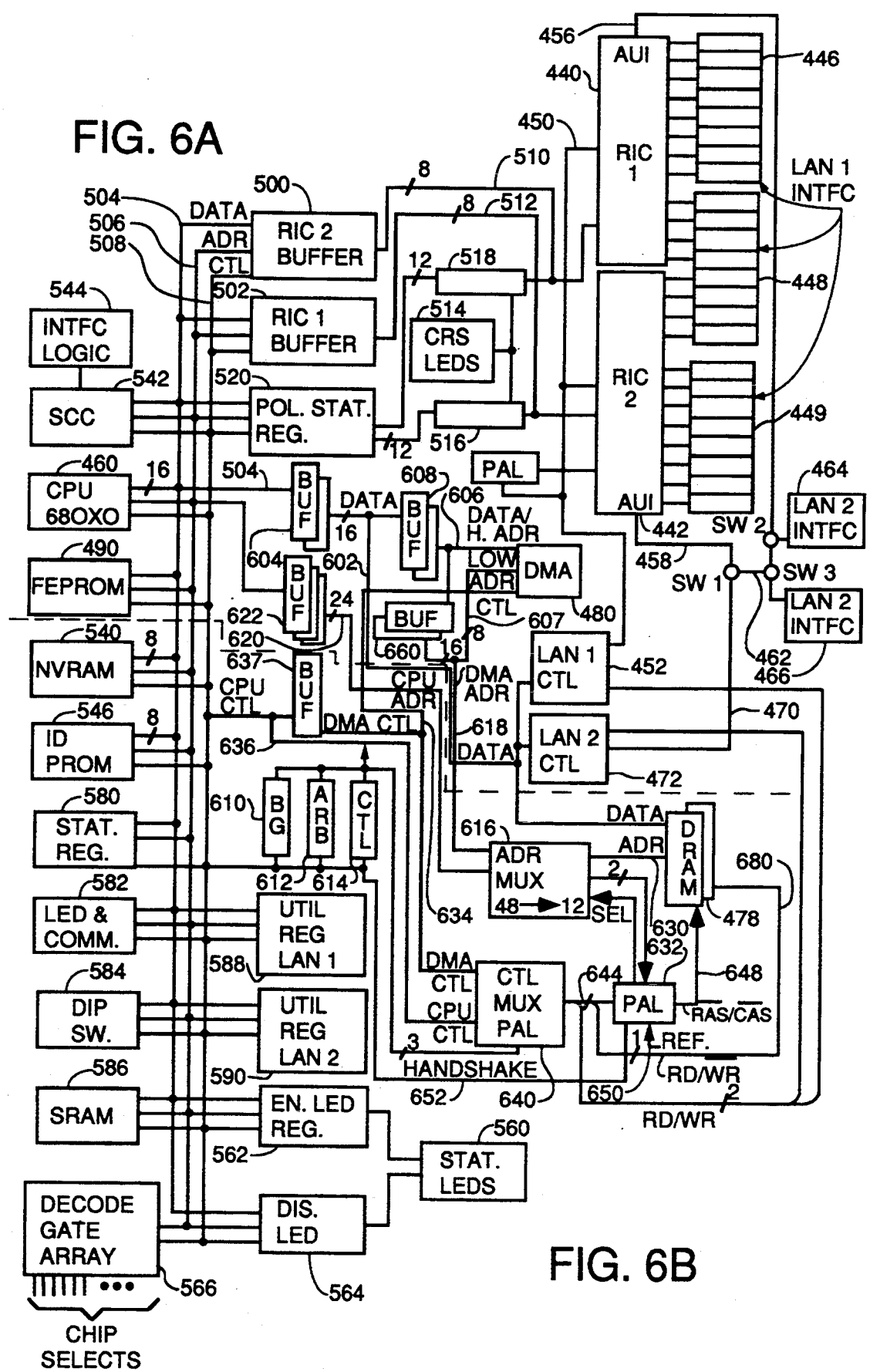
FIGS. 6A and 6B are a block diagram of the circuitry of the preferred embodiment.

If the LAN 2 forwarding vector points to the bypass or isolate mode, then the step symbolized by block 372 is performed to discard the packet. Discarding the packet implements bypass mode by virtue of the switch positions, e.g. switch SW1 in FIGS. 6A and 6B being set by a routine which is not shown to a switch position in bypass mode so as to connect the LAN 2 interface 466 or 464 directly to the AUI port of the repeaters 440 and 442. Thus any packet that arrived at a LAN 1 port is automatically sent out on LAN 2, and vice versa. In isolate mode, the switch positions for, e.g., switch SW1 in FIGS. 6A and 6B, are set so that the LAN 2 interface 466 or 464 are connected to the LAN 2 controller 472. Thus, discarding the packet by the bridge process prevents any transfer of packets from LAN 1 to LAN 2 or vice versa. Processing then returns via path 374 to the top of the bridge loop at 376 in FIG. 5A.

If the LAN 2 forwarding vector points to a routine for the bridge mode, then the processing of step 382 is performed to transmit the data packet to LAN 2 using the LAN 2 controller. This is done by the LAN 2 controller placing the packet into the transmit buffer for LAN 2. This process entails rewriting the pointers on the linked list for the transmit buffer to include the new packet in sequence in some embodiments. Processing is then returned to the top of the loop via path 375.

If the test of block 366 determined that the packet did not come from LAN 1, then in the preferred embodiment, the data packet must have come from LAN 2. This is only true in the isolate or bridge modes however, because in the bypass mode, the switch positions of, for example, switch SW1 in FIGS. 6A and 6B, are set such that the LAN 2 controller is not coupled to any LAN.

Therefore, path 367 will only be taken when the hub/bridge is operating in either the isolate or bridge modes. In that case, the process symbolized by block 390 is performed to read the pointer address from the LAN 1 forwarding vector and vector processing to the routine pointed to by that vector. In isolate mode, the processing of block 394 is performed to discard the packet, and control is returned via path 396 to the top of the bridge loop. This implements the isolate mode in the same way as described above by preventing the transmission of the packet from LAN 2 to LAN 1 as there is no direct connection in this mode from the repeater AUI port to LAN 2.

In bridge mode, the step of block 400 is performed to forward the packet to LAN 1 using the LAN 1 controller by a process similar to the process of block 382. Of course, in bypass mode, processing will never reach this step, so step 400 is really only performed for a packet arriving from LAN 2 in bridge mode. Processing is then returned to the top of the bridge loop via path 402.

In other embodiments, the pointer addresses in the forwarding vector memory locations may be written at any time by the network manager.

In still other embodiments, where the isolate mode described above is implemented, the pointer addresses of both the LAN 1 and LAN 2 forwarding vectors will be set to point to a packet discard routine. In isolate mode, the switches controlling whether the LAN 2 interface (switch 151 in FIG. 2, switch 112 in FIG. 3 or switch SW1 in FIG. 6B) is driven by the LAN 2 controller, i.e., the bridge process or by the AUI port of the repeater, are set in the same position as they are set for bridge mode of operation.

Forwarding vectors are used in the preferred embodiment to increase the speed of processing of data packets. In an alternative embodiment, forwarding vectors may be eliminated and the steps of blocks 368 and 390 may be altered to read the configuration database to determine whether the hub/bridge is in bridge mode or bypass mode and then carry out appropriate processing to either discard the packet or forward the packet to the other network.

Referring to FIGS. 6A and 6B, there is shown in a block diagram of the preferred embodiment of an integrated hub/bridge. Two repeater/controllers 440 and 442, implementing an Ethernet data link layer communication protocol, drive a plurality of 24 port interface transceiver circuits indicated generally at 446, 448 and 449. These port interface circuits can be 10Base2, 10Base-T, 10BaseF or FOIRL specific. The physical media connected to the port interface circuits can be unshielded twisted pair, coaxial cable, fiber optic waveguide etc. Any data entering on any one of the 24 ports is automatically repeated by the repeater/controller chips 440 and 442 out on all the other ports. The repeater/controllers are also known as RICs in the trade. Data is transmitted from one repeater/controller to the other via an interRIC data bus 450 which is also coupled to a LAN 1 controller 452. In the claims appended hereto, this bus is referred to as the network one data bus. The 24 ports indicated at 446, 448 and 449 comprise local area network 1 for the bridge process.

Each of the repeater controllers 440 and 442 has a AUI output port indicated at 456 and 458. The AUI port 458 is coupled to a software controlled switch SW1 which selectively couples either bus 458 or bus 470 coupled to a LAN 1 controller 452 to a bus 462 depending upon whether the integrated hub/bridge is operating in bridge or bypass mode. The bus 462 can be selectively coupled by switch SW3 to either of two LAN 2 interface transceivers which drive the physical media of LAN 2. A switch SW2 selectively couples an AUI pod 456 on RIC 440 to LAN 2 transceiver 464 in some embodiments. This allows the integrated hub/bridge to have two backbone ports operating simultaneously one of which is a repeater and one of which is bridged by proper settings of switches SW1, SW2, and SW3. Switches SW1 and SW3 can be software driven, manually operated or some combination thereof.

In bypass mode, at initialization time, switch SW1 is set by the microprocessor 460 to connect the AUI port 458 to bus 462. Switch SW3 is also set during initialization time to select either LAN 2 interface 464 or 466. In some embodiments, upon failure of one of the LAN interfaces 464 or 466, the microprocessor will automatically attempt failure recovery by changing the state of switch SW3 to select the other LAN interface so as to maintain communications with LAN 2 in either the bridge mode or the bypass mode.

If the user has selected bridge mode, during initialization time, the microprocessor will set switch SW1 to connect bus 470 to bus 462. This allows the bridge process performed by CPU 460 in software to drive the LAN 2 interface via a LAN 2 controller 472 for packets that need to be forwarded from LAN 1 to LAN 2 or vice versa. Incoming packets from LAN 2 will arrive via the selected LAN 2 interface 464 or 466 and will be transferred to the LAN 2 controller 472. The LAN 2 controller will then generate an interrupt to the CPU 460 and deposit the packet in dynamic random access memory (DRAM) 478 using DMA controller 480.

The bridging routine is embodied in a computer program which is stored in nonvolatile memory in the form of field erasable programmable read-only memory 490. This software also contains the initialization code which sets up the repeaters and sets the switch positions for bypass mode or bridge mode and writes the forwarding vector address pointers according to whatever mode is selected by the user.

The initialization routine in pseudocode is as follows:
If dynamic RAM test fails:
Stop
Set up software environment
If non-volatile RAM (NVRAM) checksum is OK:
Read system parameters from NVRAM
Else
Reinitialize system parameters in NVRAM to defaults
Determine hub type from ID PROM
Select hub mode of operation (bypass or bridge)
Do preliminary configuration of RICs
If any network interface tests fail:
stop
Initialize the I/O buffers and the bridging database
Do final hub/RIC configuration
Initialize the network interfaces (hardware)
Activate bridging
Initialize hub management agent
Start console command processor The central processing unit 460 initializes the repeater/controllers using tristate buffers 500 and 502. These buffers are coupled to the data, address and control buses, 504, 506 and 508, respectively, of the CPU 460, and essentially serve multiplexer functions in multiplexing data, address and control information from buses 504, 506 and 508 onto 8-bit shared RIC buses 510 and 512 of repeater/controllers 440 and 442.

The repeater/controllers 440 and 442, in the preferred embodiment, are National Semiconductor 83950 Ethernet RIC's, and are intelligent in the sense that they can sense certain things about the data packets being received and transmit data regarding network traffic to the microprocessor 460. This feedback data from the RIC's is transmitted to the microprocessor through the LAN 1 controller 452.

In the preferred embodiment, a microprocessor 460 is used to implement the bridge function, do initialization and carry out management functions. This CPU is any one of the Motorola 680X0 series.

The repeater/controllers also drive twenty-four CRS light emitting diodes symbolized by block 514. These diodes flicker to indicate when there is traffic on their respective ports. There is one CRS diode for every port, and each individual diode is driven through addressing and multiplexing LED logic units 516 and 518. These logic units allow the eight-bit buses 510 and 512 to be shared such that the repeater/controllers can use buses 510 and 512 to drive the LED's 514, while the CPU can use these buses to initialize the repeater/controllers and to send management commands to them to turn on and turn off ports, etc.

The logic units 516 and 518 are also used to address and store data from the RICs in a polarity status register 520. It is possible to connect the physical media to the LAN 1 interface ports with reversed polarity. If this happens, that port will not work, and this information is of interest to the network manager. Therefore, the logic circuits 516 and 518 are also used to convey polarity status information from the repeater/controllers 440 and 442 to the polarity status register 520. The polarity status information is read by the microprocessor and conveyed to the network manager.

Nonvolatile random access memory 540 is used to store the configuration and status database information as symbolized by block 294 in FIG. 4.

A serial communications controller 542 and interface logic 544 are used to couple the hub/bridge circuit to an out-of-band management control device such as terminal 302 or modem 300 in FIG. 4. This allows management functions to be invoked by the network manager via a direct coupling to the hub/bridge.

An ID PROM 546 stores the data link layer address of the hub/bridge such that in-band management data packets may use this address as their destination address and be forwarded by the bridge process to the management queue in memory 478.

The microprocessor 460 controls twenty-four status LED's symbolized by block 560. These LED's are controlled through an enable LED register 562 and a disable LED register 564. These registers may be addressed by writing their addresses on the CPU address bus 506. This address is decoded by a address decoder gate array 566 which generates appropriate chip select signals to enable the appropriate chips which are to have a transaction with the CPU.

The status LED's have a color which indicates the status of each port. If a port is functioning correctly, its corresponding status LED will be green. The corresponding status LED will be red if any of three error conditions exist for the port. These three error conditions are: improper polarity, the port is partitioned, or there is no link pulse.

The status register 580 and the LED and command circuit 582 are used by the central processing unit to signal certain conditions relating to the status of the combined hub/bridge. Typically there are eight LED's in circuit 582, four of which are used to signal hub status and four of which are used to signal network status. The CPU controls these LED's by writing data into registers in the circuit 582. The four hub status LED's are used to indicate whether power is on, whether a fault has occurred, whether the hub is in bridge or bypass mode, and whether the physical media is connected. The four network status LED's are used to indicate when data is being received from local area networks 1 and 2 and when data is being transmitted on networks 1 and 2. Normally, the local area network controllers 452 and 472 control these network status LED's during fault free operation. However, when a fault occurs, the microprocessor 460 takes over control of these LED's and writes data to the circuit 582 to cause the LED's to light in a pattern which indicates the type of fault which occurred.

The DIP switches 584 are used to troubleshoot the hub/bridge system, to select between AppleTalk Phase 1 or Phase 2 and to flush the NVRAM.

Static RAM 586 is used to store parameters for the network.

LAN 1 utilization register 588 and LAN 2 utilization register 590 are used to store counts which indicate the volume of traffic flow on local area networks 1 and 2, respectively.

Since the dynamic random access memory 478 is shared between the local area network controllers 452 and 472 via the DMA circuit 480, and the microprocessor 460, the data, address and control buses of memory 478 must be multiplexed to implement this sharing. Likewise, the microprocessor must be able to write data to the local area network controllers at the outset to inform these controllers of the locations of the transmit and receive FIFO buffers which are established in memory 478. The microprocessor also stores the bridge forwarding tables in DRAM 478.

The data bus 504 of the microprocessor is coupled to the data bus 602 of the DRAM and the data bus of the local area network controllers by a tristate buffer 604. Data bus 602 is coupled to a shared data/address bus 606 of the DMA device 480 by a tristate buffer 608. The buffers 604 and 608 have their tristate status controlled by a bus grant programmable array logic 610. Three arbitration PALs 610, 612 and 614 are used to arbitrate requests for access to the data, address and control buses such that the DRAM 478 may be shared between the DMA controller 480 and the CPU 460. For simplicity, the connections between these PALs and the buffers and multiplexers they control are generally not shown.

The address bus of the DRAM 478 is multiplexed by an address multiplexer 616 which has as its two inputs the DMA address bus 618 and the CPU address bus 620. Tristate buffer 622, coupling the microprocessor address bus 506 to the address bus segment 620, is controlled by arbitration PAL 612 to isolate the CPU address bus 506 from the address bus segment 620 when the DMA address bus is active. Selection of the address input to apply to the DRAM address bus 630 is controlled by a programmable array logic 632.

Control signals from the DMA device on bus 634 and control signals from the CPU on bus 636 are coupled to the two selectable inputs of a control multiplexer/PAL

640. The MUX/PAL 640 also receives three control inputs from the control PAL 614, one of which controls selection of the particular control bus input to couple to the output bus 644. A portion of the signals on bus 644 are applied as input signals to the PAL 632 to control its state and two output signals from the address multiplexer 616 are also applied as inputs to this PAL 632. PAL 632 generates the row address strobe/column address strobe signal on line 648 to control whether the address on bus 630 to the DRAM is used to address a row or column. The PAL 632 also receives a refresh signal on line 650 from a timing circuit (not shown) which causes the PAL 632 to refresh the DRAM 478 at a 64-kilohertz rate. The PAL 632 also generates a handshake signal on line 652 to inform the control PAL 614 that a refresh cycle is under way and to not attempt to grant bus access to either the DMA control bus 634 or the CPU control bus 636 via buffer 637.

Finally, a tri-state buffer 660 is used to multiplex the data/high address bus 606 from the DMA device 480 such that when the DMA is granted access to the address bus of the DRAM, bus segment 606 is coupled to the low address bus segment 607 to form a 24-bit DMA address bus 618.

The control MUX/PAL 640 also generates a read-/write control signal to the DRAM on line 680 to control whether the DRAM is reading or writing. The MUX/PAL 640 also generates a read/write control signal to the LAN controllers 452 and 472 to allow these controllers to be either written or read by the microprocessor 460.

The bus grant PAL 610, the arbitration PAL 612 and the control PAL 614 control the states of the PAL 632 and the buffers 604, 608, 660, 622, and 637 so as to time division multiplex or arbitrate the data, address and control buses such that the DRAM 478 may be shared. The details of this bus arbitration or multiplexing are not critical to the invention, and any other arbitration scheme known in the prior art may also be used and still be within the scope of the teachings of the invention. Further, in alternative embodiments, separate DRAM memories may be used for the local area network controllers, and the bridging process and for any other process which needs DRAM memory assigned to it such that bus arbitration can be simplified.

The program is executed by the microprocessor 460, written in C source code and assembly language on an Apple MPW 3.0 development system. The microprocessor 460 is a Motorola 68000 in the preferred embodiment, but other microprocessors in the 68000 series should also execute this code properly when compiled for their particular machine language. The actual schematic diagrams and PAL equations of the best mode of carrying out the teachings of the invention are included in the application file as Appendix B and Appendix C, not printed.

Although the invention has been described in terms of the preferred and alternative embodiments disclosed herein, those skilled in the art will appreciate other modifications which may be made without departing from the spirit and scope of the invention. All such modifications and enhancements are intended to be included within the scope of the claims appended hereto.

What is claimed is:

1. An apparatus for connection to first and second networks of computing machines, each said network having different network addresses for computer software processes in execution on machines coupled said first and second networks, comprising:

a support structure;

memory means mechanically coupled to said support structure for storing data and a computer program, said data comprising data packets to be transmitted on said first network stored in a first transmit buffer, and data packets to be transmitted on said second network stored in a second transmit buffer, and data packets received from said first network stored in a first receive buffer, and data packets received from said second network stored in a second receive buffer;

a plurality of hub port means affixed to said support structure, for coupling to said first network external to said support structure via a plurality of corresponding transceiver cables which are coupled to and carry data packets to and from a plurality of machines each of which has computer software processes in execution thereon, each said computer software process having a network address, and wherein when each said computer software process is a source of a data packet, said data packet transmitted by said computer software process will contain the network address of said computer software process as the source network address, and wherein when each said computer software process is a destination of a data packet, said data packet received by said computer software process will contain the network address of said computer software process as the destination network address, each said hub port means for sending data packets out on said first network via a corresponding transceiver cable and for receiving data packets from said first network via a corresponding transceiver cable;

hub means for receiving a data packet from any of said hub port means and for retransmitting each said data packet out on said first network through every other said hub port means coupled to said first network other than said hub port means from which said data packet was received, and for sending all said retransmitted data packets out on a data path affixed to said support structure and which carries data which came from or which is bound for said first network segment, each said data packet having a source network address identifying the network address of the machine from which the data originated and a destination network address identifying the network address of the machine for which the data is bound;

first network controller means affixed to said support structure for retrieving data packets from said first transmit buffer in said memory means and for sending said retrieved data packets out on said first network by sending said data packets to said hub means via said data path, and for receiving data packets from said hub means via said data path and storing said data packets in said first receive buffer in said memory means;

second network transceiver means affixed to said support structure for receiving data packets and for transmitting data packets on said second network;

second network controller means affixed to said support structure and coupled to said second network transceiver means and coupled to said memory means, for retrieving data packets from said second transmit buffer in said memory means and for sending said retrieved data packets to said second network transceiver means for transmission on said second network, and for receiving data packets from said second network transceiver means and for storing said data packets in said second receive buffer;

computer means affixed to said support structure and coupled to said memory means, said hub means and said first and second network controllers by an address and control bus and by a data bus, said computer means for executing said computer program stored in said memory means, said computer program including bridge means for selectively coupling data packets from said first network to said second network and vice versa, said selective coupling performed by reading at least the destination network address of each received data packet in said first and second receive buffers in said memory means and, for each data packet, comparing the destination network address to which the data packet is to be sent to data indicating whether said destination network address is located on said first network or on said second network, and, if the data packet was retrieved from said first receive buffer but is addressed to a destination network address on said second network, for forwarding said data packet to said second network controller via said data bus, and, if the data packet was retrieved from said second receive buffer but is addressed to a destination network address on said first network, for forwarding said data packet to said first network controller via said data bus for transmission on said first network and for discarding any data packet retrieved from either the first or second receive buffer if the destination network address of the data packet is on the same network as the source network address from which said data packet originated.

2. The apparatus of claim 1 wherein said computer program includes one or more routines to manage said first and second transmit buffers and said first and second receive buffers in said memory means as linked lists which record the sequence in which each data packet was received in the case of the first and second receive buffers and record the sequences in which the data packets are to be transmitted in the case of the transmit buffers, and wherein each linked list is comprised of individual data packets stored in different addresses in one of said buffers, and each data packet is stored with an associated pointer which contains data indicating the address of the next data packet in the sequence recorded in said linked list.

3. The apparatus of claim 2 wherein said computer program includes a routine for discarding data packets by rearranging said pointers of said first or second receive buffer linked list so as to omit reference to the data packet to be discarded.

4. The apparatus of claim 2 wherein said hub means includes an attachment unit interface port at which data packets received from said first network are repeated for transmission, and wherein said second network controller means and said attachment unit interface port are selectively, alternatively coupled to said second network transceiver means by a switch, said switch being coupled to and controlled by said computer means which is controlled by said computer program, and further comprising a routine in said computer program to selectively implement a bypass mode wherein said switch is set to a position to cut off said second network controller means from said second network transceiver means and said attachment unit interface port is coupled directly to said second network transceiver means such that said second network controller is bypassed thereby disabling said bridge means such that data packets received from either said first network segment or said second network segment are automatically transmitted on the other network segment regardless of the location of the destination address of any particular data packet.

5. The apparatus of claim 4 wherein said computer program includes means for and using forwarding vectors to speed up processing of data packets in said receive buffers of said first and second networks, each said forwarding vector comprising a designated memory location for a corresponding one of said first or second networks which stores a pointer address pointing to the starting address in said memory means of a bypass mode routine forming part of said computer program controlling operations of said computer means if bypass mode is active, and storing the address of a bridge mode routine if bypass mode is not active, and storing the address of an isolate mode routine if isolate mode is active, said bypass mode for discarding each data packet that came from said first network by rearranging said pointers on said linked list in said first receive buffer so as to skip over said data packet to be discarded, and, if said data packet came from said second network, for placing said data packet in the linked list stored in said first transmit buffer by rearranging the pointers of said linked list to point to said data packet to be forwarded so that said data packet will be transmitted on said first network in the sequence defined by the pointers of the linked list associated with said first transmit buffer, said isolate mode routine also controlling said computer means to discard each data packet that came from either said first or second network by rearranging said pointers on said linked list in said first receive buffer if said data packet came from said first network or by rearranging said pointers on said linked list in said second receive buffer if said data packet came from said second network, said rearranging of pointers being carried out so as to skip over said data packet to be discarded, said bridge mode routine for controlling said computer means so as to place each said data packet to be forwarded from one network to the other network into the linked list of the transmit buffer of the network containing the destination network address of data packet to be forwarded by rearranging said pointers of the linked list of the transmit buffer for the network to which the data packet to be forwarded so as to point to said data packet.

6. The apparatus of claim 4 further comprising means in said computer program to implement an isolate mode of operation wherein said bridge means is disabled and no data packet is transferred from said first network to said second network, or vice versa, and wherein said switch is set to a position to connect said second network transceiver means to said second network controller.

7. The apparatus of claim 4 wherein said computer program includes in-band management means for receiving and processing in-band management data packets received from either of said first or second networks and for performing any desired management function, command or status inquiry by interacting with said hub means, said first or second network controller means and/or said bridge means, and further comprising isolate mode means in said computer program for setting the position of said switch to a position to connect said second network transceiver means to said second network controller but for rearranging said pointers on the linked lists of the first and/or second transmit buffers so as to skip over any data packets that said bridge means would otherwise transfer from one network to the other such that no data packet is transferred from said first network to said second network by said bridge means while isolate mode is active, but for detecting and directing any in-band management packet which arrives from either said first or said second network to said in-band management means for processing thereby.

8. The apparatus of claim 1 wherein said bridge means includes means for storing in said memory means a forwarding table listing source and/or destination network addresses associated with said first and second networks, and further comprises means for making an entry in said forwarding table containing the source network address or the destination address or both of a data packet which has been received from either said first network or said second network which is found to have no errors, each said entry associating at least the source network address of said data packet with the network identification of the network from which the data packet originated.

9. The apparatus of claim 1 further comprising a serial communication interface means coupled to said computer means for receiving management commands directly from a terminal or modem, and wherein said computer program means includes console command process means for receiving said management commands from said serial communication interface means and for performing the desired management command, function or status inquiry by interacting with said hub means, said bridge means, and/or said first or second network controller means, or, if the management command so received is addressed to some other device or devices connected to either said first network or said second network, for converting said management command into a data packet by appending at least appropriate header and network address information to said management command, said header including at least source and destination network addresses sufficient to direct said data packet containing said management command to the computing machine to be managed and placing the resulting data packet in said transmit buffer of the network containing the destination network address of the computing machine to which said data packet is addressed.

10. The apparatus of claim 1 further comprising means in said computer program to implement an isolate mode of operation wherein no data packet is transferred from said first network to said second network or vice versa.

11. The apparatus of claim 1 or 2 or 3 or 4 or 5 or 8 or 9 or 10 or 6 wherein said computer program includes means for receiving and processing SNMP (Simple Network Management Protocol) in-band management data packets received from either of said first or second networks and for performing any desired management function, command or status inquiry encoded in said SNMP data packet by appropriately interacting with said hub means, said first or second network controller means, said hub port means and/or said bridge means.

12. The apparatus of claim 1 or 2 or 3 or 4 or 5 or 8 or 9 or 10 or 6 wherein said computer program implementing said bridge function includes means for filtering by network communication protocol such that data packets from said first network but having destination addresses on said second network and having communication protocols which are incompatible with the communication protocol in use on said second network and which said means for filtering is programmed to filter out will not be forwarded to said second network, and such that data packets received from said second network but having destination addresses on said first network but having communication protocols which are incompatible with the communication protocol in use on said first network and which said means for filtering is programmed to filter out will not be forwarded to said second network.

13. The apparatus of claim 1 or 2 or 3 or 4 or 5 or 8 or 9 wherein said support structure further comprises a single enclosure which houses all of said memory means, said hub means, said hub port means, said first network controller means, said second network transceiver means and said second network controller means, said computer means and said computer program.

14. An apparatus for coupling to first and second networks upon which data packets are being transmitted on one or more physical data transmission media, comprising:

a physical support for supporting electronic circuitry;
a memory for storing data packets to be transmitted on either said first or second network and for storing data packets received from either said first or second network;
a bridge circuit mounted on said physical support and comprising at least first and second network interface circuits coupled to said first and second networks, respectively, each said network having physical data transmission media, said first and second network interfaces for converting data packets to be transmitted on said first and/or second networks which have been retrieved from said memory into electrical signals to propagate on said physical data transmission media of said first and/or second networks, said first and second networks each coupling a plurality of computing machines together for data exchange, each said computing machine having a network address which is a source network address when said computing machine is transmitting data as electrical signals on either said first or second network and is a destination network address when said computing machine is receiving data as electrical signals from either said first or second network, said first and second network interfaces also for receiving electrical signals transmitted by one or more of said computing machines via said physical data transmission media of said first or second networks and converting said electrical signals into data packet in said memory, each said data packet having a source network address which is the network address of the computing machine which transmitted said data packet and a destination network address which is the network address of the computing machine which said data packet is bound, said bridge circuit for selectively forwarding a data packet received from a computing machine coupled to said first network to a computing machine coupled to said second network via said first network interface if the destination network address of said data packet received from said computing machine coupled to said first network is the network address of a computing machine coupled to said second network or if said destination address of the received data packet is not known to be the network address of a computing machine coupled to either of said first or second networks, and for selectively forwarding a data packet received from a computing machine coupled to said second network to a computing machine coupled to said first network via said first network interface if the destination address of said data packet received from said computing machine coupled to said second network is the network address of a computing machine coupled to said first network or if said destination network address of the received data packet is not the network address of a computing machine coupled to either of said first or second networks;

and wherein at least one of said network interface circuits includes a repeater mounted on said physical support and which has at least two ports each of which is coupled to one of said data transmission media forming part of the network coupled to said network interface circuit which includes said repeater, said repeater for receiving data packets at one or more of said pods and automatically retransmitting said data packets out all ports of said repeater regardless of the destination network address of any particular data packet being retransmitted;

and further comprising management means mounted on said support structure and coupled to said bridge circuit and to said first and second network interface means, for receiving Simple Network Management Protocol commands and carrying out said commands, and wherein said repeater is part of said first network interface circuit and includes an Attachment Unit Interface port from which are transmitted said data packets being transmitted from the other of said ports of said repeater and which can receive data packets, and further comprising switch means for selectively coupling said Attachment Unit Interface port to said second network interface circuit, and wherein said bridge circuit includes bypass means for setting said switch means such that said Attachment Unit Interface port is coupled to said second network in a bypass mode such that any data packet arriving at said Attachment Unit Interface from either of said first or second networks is automatically repeated on the other network, and wherein said management means includes means for receiving in-band management data packets from computing machines coupled to either said first network or second network and carrying out said commands.

15. The apparatus of claim 14 further comprising isolate means for preventing any transfer of data packets from said first network to said second network or vice versa and wherein said isolate means includes means for directing any in-band management data packets that arrive from either said first or second network to said management means for execution thereby even when said isolate means is active in preventing any data packet transfer between said networks.

16. An apparatus for coupling to first and second networks upon which data packets are being transmitted on one or more physical data transmission media, comprising:

a physical support for supporting electronic circuitry;

a memory for storing data packets to be transmitted on either said first or second network and for storing data packets received from either said first or second network;

a bridge circuit mounted on said physical support and comprising at least first and second network interface circuits coupled to said first and second networks, respectively, each said network having physical data transmission media, said first and second network interfaces for converting data packets to be transmitted on said first and/or second networks which have been retrieved from said memory into electrical signals to propagate on said physical data transmission media of said first and/or second networks, said first and second networks each coupling a plurality of computing machines together for data exchange, each said computing machine having a network address which is a source network address when said computing machine is transmitting data as electrical signals on either said first or second network and is a destination network address when said computing machine is receiving data as electrical signals from either said first or second network, said first and second network interfaces also for receiving electrical signals transmitted by one or more of said computing machines via said physical data transmission media of said first or second networks and converting said electrical signals into data packets for storage in said memory, each said data packet having a source network address which is the network address of the computing machine which transmitted said data packet and a destination network address which is the network address of the computing machine for which said data packet is bound, said bridge circuit for selectively forwarding a data packet received from a computing machine coupled to said first network to a computing machine coupled to said second network via said second network interface if the destination network address of said data packet received from said computing machine coupled to said first network is the network address of a computing machine coupled to said second network or if said destination address of the received data packet is not known to be the network address of a computing machine coupled to either of said first or second networks, and for selectively forwarding a data packet received from a computing machine coupled to said second network to a computing machine coupled to said first network via said first network interface if the destination address of said data packet received from said computing machine coupled to said second network is the network address of a computing machine coupled to said first network or if said destination network address of the received data packet is not the network address of a computing machine coupled to either of said first or second networks;

and wherein at least one of said network interface circuits includes a repeater mounted on said physical support and which has at least two ports each of which is coupled to one of said data transmission media forming part of the network coupled to said network interface circuit which includes said repeater, said repeater for receiving data packets at one or more of said ports and automatically retransmitting said data packets out all ports of said repeater regardless of the destination network address of any particular data packet being retransmitted;

and further comprising management means mounted on said support structure and coupled to said bridge circuit and to said first and second network interface means, for receiving Simple Network Management Protocol commands and carrying out said commands, and wherein said bridge circuit includes means for selective deactivation of bridging activity in a bypass mode which, when active, causes all data packets received from said first network to be retransmitted on said second network and which causes all data packets received from said second network to be retransmitted on said first network, and further comprising isolate means for selectively preventing any transfer of data packets from said first network to said second network and which prevents any transfer of data packets from said second network to said first network.

17. An apparatus for connection to first and second local area networks, each said network coupled to a plurality of machines by a plurality of transceiver cables, each said network having different network addresses for computer software processes in execution on said machines coupled thereto, comprising:

a support structure including a housing;

memory means mechanically coupled to said support structure for storing data and a computer program, said data comprising data packets to be transmitted on said first network stored in a first transmit buffer, and data packets to be transmitted on said second network stored in a second transmit buffer, and data packets received from said first network stored in a first receive buffer, and data packets received from said second network stored in a second receive buffer;

twenty six or fewer hub port means affixed to said support structure, for coupling to a first network external to said support structure via a plurality of corresponding transceiver cables coupled to and carrying data to and from a plurality of machines each of which has computer software processes in execution thereon, each said computer software process having a network address, and wherein when each said computer software process is acting as a source of a data packet said data packet transmitted by said computer software process will contain the network address of said computer software process as the source network address, and wherein when each said computer software process is a destination of a data packet, said data packet received by said computer software process will contain the network address of said computer software process as the destination network address, each said hub port means for sending data packets out on said first network segment via a transceiver cable and for receiving data packets from said first network via a transceiver cable;

hub means for receiving a data packet from any of said hub port means and for retransmitting each said data packet out on said first network through every other said hub port means coupled to said first network other than said hub port means from which said data packet was received, and for sending all said retransmitted data packets out on a data path affixed to said support structure and which carries data which came from or which is bound for said first network, each said data packet having a source network address identifying the network address of the machine from which the data originated and a destination network address identifying the network address of the machine for which the data is bound;

first network controller means affixed to said support structure for retrieving data packets from said first transmit buffer in said memory means and for sending said retrieved data packets out on said first network by sending said data packets to said hub means via said data path, and for receiving data packets from said hub means via said data path and storing said data packets in said first receive buffer in said memory means;

second network transceiver means affixed to said support structure for receiving data packets and for transmitting data packets on said second network;

second network controller means affixed to said support structure and coupled to said second network transceiver means, for retrieving data packets from said second transmit buffer in said memory means and for sending said retrieved data packets to said second network transceiver means for transmission on said second network, and for receiving data packets from said second network transceiver means and for storing said data packets in said second receive buffer;

computer means affixed to said support structure and coupled to said memory means and to said first and second network controllers and said hub means by an address and control bus and by a data bus, said computer means for executing a computer program stored in said memory means, said computer program including bridge means for selectively coupling data packets from said first network to said second network and vice versa, said selective coupling performed by reading at least the destination network address of each received data packet in said first and second receive buffers in said memory means and, for each data packet, comparing the destination network address of the data packet to which the data packet is to be sent to data indicating whether said destination network address is located on said first network or on said second network, and, if the data packet was retrieved from said first receive buffer but is addressed to a destination network address on said second network, for forwarding said data packet to said second network controller via said data bus, and, if the data packet was retrieved from said second receive buffer but is addressed to a destination network address on said first network, for forwarding said data packet to said first network controller via said data bus for transmission on said first network and for discarding any data packet retrieved from either the first or second receive buffer if the destination network address of the data packet is on the same network as the source network address from which said data packet originated, said computer program further comprising management means for receiving, from a management process in execution on a computer external to said support structure, management commands and requests to control or gather data from said hub means, said hub port means, said first network controller means, said second network controller means, said second transceiver means or said bridge means, and for carrying out said commands or gathering the requested data and sending said data back to said management process that originated said management command or data request.

18. The apparatus of claim 17 wherein said control program further comprises means for implementing the national standard Internet Protocol defined by RFC 791, the Internet Control Message Protocol defined by RFC 792, the Address Resolution Protocol defined by RFC 826, and the Reverse Address Resolution Protocol defined by RFC 903 as these protocols were defined and published by the IETF at the time this application was filed.

19. The apparatus of claim 18 wherein said management means implements the Simplified Network Management Protocol defined in national standard RFC 1157 and the User Datagram Protocol defined in national standard RFC 768 as these protocols were defined and published by the IETF at the time this application was filed.

20. The apparatus of claim 19 wherein said management means further comprises means to implement the Transmission Control Protocol defined in national standard RFC 793, and the Telnet Service Protocol as defined in national standard RFC 854 as these protocols were defined and published by the IETF at the time this application was filed.

21. The apparatus of claim 17 wherein said bridge means implements the spanning tree, filtering by protocol bridging process defined in I.E.E.E. standard 801.1(d) as this standard was defined at the time this application was filed.

22. The apparatus of claim 21 wherein said bridge means implements national standard RFC 1286 published by the IETF as of the time this application was filed and wherein said hub means implements national standard RFC 1368 published by the IETF as of the time of filing of this application.

23. An apparatus for connection to first and second networks, each said network having different network addresses for computer software processes in execution on machines coupled thereto, comprising:

a support structure including a housing;

memory means mechanically coupled to said support structure for storing data and a computer program, said data comprising data packets to be transmitted on said first network stored in a first transmit buffer, and data packets to be transmitted on said second network stored in a second transmit buffer, and data packets received from said first network stored in a first receive buffer, and data packets received from said second network stored in a second receive buffer;

twenty six or fewer hub port means affixed to said support structure, for coupling to a first network external to said support structure via a plurality of corresponding transceiver lines which are coupled to and carry data to and from a plurality of machines, each of which has computer software processes in execution thereon, each said computer software process having a network address, and wherein when each said computer software process is a source of a data packet, said data packet transmitted by said computer software process will contain the network address of said computer software process as the source network address, and wherein when each said computer software process is a destination of a data packet, said data packet received by said computer software process will contain the network address of said computer software process as the destination network address, each said hub port means for sending data packets out on said first network via a corresponding transceiver cable and for receiving data packets from said first network via a corresponding transceiver cable;

hub means for receiving a data packet from any of said hub port means and for retransmitting each said data packet out on said first network through every other said hub port means coupled to said first network other than said hub port means from which said data packet was received, and for sending all said retransmitted data packets out on a data path affixed to said support structure and which carries data packets which came from or which are bound for said first network, each said data packet having a source network address identifying the network address of the machine from which the data packet originated and a destination network address identifying the network address of the machine for which the data packet is bound;

first network controller means affixed to said support structure for retrieving data packets from said first transmit buffer in said memory means and for sending said retrieved data packets out on said first network by sending said data packets to said hub means via said data path, and for receiving data packets from said hub means via said data path and storing said data packets in said first receive buffer in said memory means;

second network transceiver means affixed to said support structure for receiving and transmitting data packets on said second network;

second network controller means affixed to said support structure and coupled to said second network transceiver means, for retrieving data packets from said second transmit buffer in said memory means and for sending said retrieved data packets to said second network transceiver means for transmission on said second network, and for receiving data packets from said second network transceiver means and for storing said data packets in said second receive buffer;

computer means affixed to said support structure and coupled to said memory means and to said first and second network controllers and said hub means by an address and control bus and by a data bus, said computer means for executing a computer program stored in said memory means, said computer program including bridge means for selectively coupling data packets from said first network to said second network and vice versa, said selective coupling performed by reading at least the destination network address of each received data packet in said first and second receive buffers in said memory means and, for each data packet, comparing the destination network address to which the data packet is to be sent to data indicating whether said destination network address is located on said first network or on said second network, and, if the data packet was retrieved from said first receive buffer but is addressed to a destination network address on said second network, for forwarding said data packet to said second network controller via said data bus, and, if the data packet was retrieved from said second receive buffer but is addressed to a destination network address on said first network, for forwarding said data packet to said first network controller via said data bus for transmission on said first network and for discarding any data packet retrieved from either the first or second receive buffer if the destination network address of the data packet is on the same network as the source network address from which said data packet originated, said computer program means further comprising management means for receiving from a management process in execution external to said support structure management commands and requests to control or gather data from said hub means, said hub port means, said first network controller means, said second network controller means, said second transceiver means or said bridge means, and for carrying out said commands or gathering the requested data and sending said data back to said management process that originated said management command or data request, and wherein said computer program further comprises bridge bypass means for selectively disabling said bridge means such that every data packet retrieved from said first receive buffer is forwarded to said second network controller means via said data bus for transmission on said second network, and every data packet retrieved from said second receive buffer is forwarded to said first network controller means via said data bus for transmission on said first network.

24. The apparatus of claim 23 wherein said management means implements the SNMP management protocol.

25. The apparatus of claim 24 further comprising a modem port coupled to said management means such that said management commands and requests to gather data can be sent to said management means from a management process in execution elsewhere and coupled to said management means only by a modem and a telephone circuit.

26. The apparatus of claim 23 wherein said computer program further comprises means for implementing the national standard Internet Protocol defined by RFC 791, the Internet Control Message Protocol defined by RFC 792, the Address Resolution Protocol defined by RFC 826, and the Reverse Address Resolution Protocol defined by RFC 903 as these protocols were defined and published by the IETF at the time this application was filed.

27. The apparatus of claim 26 wherein said management means implements the Simplified Network Management Protocol defined in national standard RFC 1157 and the User Datagram Protocol defined in national standard RFC 768 as these protocols were defined and published by the IETF at the time this application was filed.

28. The apparatus of claim 27 wherein said management means further comprises means to implement the Transmission Control Protocol defined in national standard RFC 793, and the Telnet Service Protocol as defined in national standard RFC 854 as these protocols were defined and published by the IETF at the time this application was filed.

29. The apparatus of claim 28 wherein said computer program includes means to implement the national standard SNMP management protocol.

30. The apparatus of claim 29 further comprising means for receiving and carrying out management commands via modem.

31. An apparatus for connection to first and second networks, each said network characterized by different network addresses for computer software processes in execution on machines coupled thereto, comprising:

a support structure including a housing;

memory means mechanically coupled to said support structure for storing data and a computer program, said data comprising data packets to be transmitted on said first network stored in a first transmit buffer, and data packets to be transmitted on said second network stored in a second transmit buffer, and data packets received from said first network stored in a first receive buffer, and data packets received from said second network stored in a second receive buffer;

twenty six or fewer hub port means affixed to said support structure, for coupling to a first network external to said support structure via a plurality of corresponding transceiver cables which are coupled to and carry data to and from a plurality of machines each of which has computer software processes in execution thereon, each said computer software process having a network address, and wherein when said computer software process is a source of a data packet, said data packet transmitted by said computer software process will contain the network address of said computer software process as the source network address, and wherein when said computer software process is a destination of a data packet, said data packet received by said computer software process will contain the network address of said computer software process as the destination network address, each said hub port means for sending data packets out on said first network segment via a corresponding transceiver cable and for receiving data packets from said first network via a corresponding transceiver cable;

hub means for receiving a data packet from any of said hub port means and for retransmitting each said data packet out on said first network through every other said hub port means coupled to said first network other than said hub port means from which said data packet was received, and for sending all said retransmitted data packets out on a data path affixed to said support structure and which carries data which came from or which is bound for said first network, each said data packet having a source network address identifying the network address of the machine from which the data originated and a destination network address identifying the network address of the machine for which the data is bound;

first network controller means affixed to said support structure for retrieving data packets from said first transmit buffer in said memory means and for sending said retrieved data packets out on said first network by sending said data packets to said hub means via said data path, and for receiving data packets from said hub means via said data path and storing said data packets in said first receive buffer in said memory means;

second network transceiver means affixed to said support structure for sending and receiving data packets on said second network via a repeater and twenty-six or fewer media access units coupling said repeater to conductors of said second network;

second network controller means affixed to said support structure and coupled to said second network transceiver means, for retrieving data packets from said second transmit buffer in said memory means and for sending said retrieved data packets to said second network transceiver means for transmission on said second network, and for receiving data packets from said second network transceiver means and for storing said data packets in said second receive buffer;

computer means affixed to said support structure and coupled to said memory means and to said first and second network controllers and said hub means by an address and control bus and by a data bus, said computer means for executing a computer program stored in said memory means, said computer program including bridge means for selectively coupling data packets from said first network to said second network and vice versa, said selective coupling performed by reading at least the destination network address of each received data packet in said first and second receive buffers in said memory means and, for each data packet, comparing the destination network address to which the data packet is to be sent to data indicating whether said destination network address is located on said first network or on said second network, and, if the data packet was retrieved from said first receive buffer but is addressed to a destination network address on said second network, for forwarding said data packet to said second network controller via said data bus, and, if the data packet was retrieved from said second receive buffer but is addressed to a destination network address on said first network, for forwarding said data packet to said first network controller via said data bus for transmission on said first network and for discarding any data packet retrieved from either the first or second receive buffer if the destination network address of the data packet is on the same network as the source network address from which said data packet originated, and wherein said computer program further comprises bridge bypass means for selectively disabling said bridge means such that every data packet retrieved from said first receive buffer is forwarded to said second network controller means via said data bus regardless of the destination network address of said data packet for transmission on said second network, and every data packet retrieved from said second receive buffer is forwarded to said first network controller means via said data bus regardless of the destination network address of said data packet for transmission on said first network, and wherein said computer program further comprises isolate means for selectively disabling said bridge means when an isolate mode is active by preventing any transfer of data packets from said first network segment to said second network segment.

32. An apparatus for coupling to first and second networks upon which data packets are being transmitted on one or more physical media segments, comprising:

a physical support for supporting electronic circuitry;

a memory for storing data packets to be transmitted on either said first or second network and for storing data packets received from either said first or second network;

a bridge circuit mounted on said physical support and comprising at least first and second network interface circuits coupled to said first and second networks, respectively, each said network having physical data transmission media, said first and second network interfaces for converting data packets to be transmitted on said first and/or second networks and retrieved from said memory into electrical signals to propagate on said physical data transmission media of said first and/or second networks, said first and second networks each coupling a plurality of computing machines together for data exchange, each said computing machine having a network address which is a source network address in a data packet when said computing machine is transmitting said data packet as electrical signals on either said first or second network and is a destination network address in a data packet when said computing machine is receiving said data packet as electrical signals from either first or second network, said first and second network interfaces also for receiving electrical signals transmitted by one or more of said computing machines via said physical data transmission media of said first or second networks and converting said electrical signals into data packets for storage in said memory, each said data packet having a source network address indicating the computing machine which transmitted said data packet and a destination network address indicating the computing machine for which said data packet is bound, said bridge circuit for selectively forwarding a data packet received from a computing machine coupled to said first network to a computing machine coupled to said second network via said second network interface if the destination network address of said data packet received from said computing machine coupled to said first network is the network address of a computing machine coupled to said second network or if said destination network address of the received data packet has not been previously recorded in said memory by said bridge means as the network address of a computing machine coupled to either of said first or second networks, and for selectively forwarding a data packet received from a computing machine coupled to said second network to a computing machine coupled to said first network via said first network interface if the destination network address of said data packet received from said computing machine coupled to said second network is the network address of a computing machine coupled to said first network or if said destination network address of the received data packet has not been previously recorded by said bridge means in said memory as the network address of a computing machine coupled to either of said first or second networks;

and wherein at least one of said network interface circuits includes a repeater mounted on said physical support and which has at least two ports each of which is coupled to a physical media segment forming part of the network coupled to said network interface circuit which repeater, said repeater for receiving data packets at one or more of said ports and automatically retransmitting said data packets out on all other ports of said repeater regardless of the destination network address of any particular data packet being retransmitted; and a management circuit coupled to said bridge circuits, said repeater(s) and said network interface circuits, for receiving and carrying out management commands, and wherein each said repeater drives an attachment unit interface port and twenty-six or fewer media access units, and further comprising a bypass circuit for bypassing said bridge circuit such that any data packet arriving from either of said first or second networks is automatically transmitted on the other network via the network interface circuit and all media access units connected thereto in addition to being retransmitted via the network interface circuit of the network from which said data packet originated and substantially all media access units coupled thereto.

33. An apparatus for coupling to first and second networks upon which data packets are being transmitted on one or more physical media segments, comprising:

a physical support for supporting electronic circuitry;

a memory for storing data packets to be transmitted on either said first or second network and for storing data packets received from either said first or second network;

a bridge circuit mounted on said physical support and comprising at least first and second network interface circuits coupled to said first and second networks, respectively, each said network having physical data transmission media, said first and second network interfaces for converting data packets to be transmitted on said first and/or second networks and retrieved from said memory into electrical signals to propagate on said physical data transmission media of said first and/or second networks, said first and second networks each coupling a plurality of computing machines together for data exchange, each said computing machine having a network address which is a source network address in a data packet when said computing machine is transmitting said data packet as electrical signals on either said first or second network and is a destination network address in a data packet when said computing machine is receiving said data packet as electrical signals from either first or second network, said first and second network interfaces also for receiving electrical signals transmitted by one or more of said computing machines via said physical data transmission media of said first or second networks and converting said electrical signals into data packets for storage in said memory, each said data packet having a source network address indicating the computing machine which transmitted said data packet and a destination network address indicating the computing machine for which said data packet is bound, said bridge circuit for selectively forwarding a data packet received from a computing machine coupled to said first network to a computing machine coupled to said second network via said second network interface if the destination network address of said data packet received from said computing machine coupled to said first network is the network address of a computing machine coupled to said second network or if said destination network address of the received data packet has not been previously recorded in said memory by said bridge means as the network address of a computing machine coupled to either of said first or second networks, and for selectively forwarding a data packet received from a computing machine coupled to said second network to a computing machine coupled to said first network via said first network interface if the destination network address of said data packet received from said computing machine coupled to said second network is the network address of a computing machine coupled to said first network or if said destination network address of the received data packet has not been previously recorded by said bridge means in said memory as the network address of a computing machine coupled to either of said first or second networks;

and wherein at least one of said network interface circuits includes a repeater mounted on said physical support and which has at least two ports each of which is coupled to a physical media segment forming part of the network coupled to said network interface circuit which includes said repeater, said repeater for receiving data packets at one or more of said ports and automatically retransmitting said data packets out on all other ports of said repeater regardless of the destination network address of any particular data packet being retransmitted; and a management circuit coupled to said bridge circuit, said repeater(s) and said network interface circuits, for receiving and carrying out management commands, and wherein said apparatus includes means coupled to said bridge circuit, said network interface circuit and said repeater(s) for implementing the national standard Internet Protocol defined by RFC 791, the Internet Control Message Protocol defined by RFC 792, the Address Resolution Protocol defined by RFC 826, and the Reverse Address Resolution Protocol defined by RFC 903 as these protocols were defined and published by the IETF at the time this application was filed.

34. The apparatus of claim 33 wherein said bridge circuit implements the spanning tree, filtering by protocol bridging process defined in I.E.E.E. standard 801.1(d) as that protocols was defined and published at the time this application was filed.

35. The apparatus of claim 33 wherein said bridge means implements national standard RFC 1286 for bridge MIBs published by the IETF as of the time this application was filed and wherein said hub means implements national standard RFC 1368 for repeater MIBs published by the IETF as of the time of filing of this application.

36. An apparatus for coupling to first and second networks upon which data packets are being transmitted on one or more physical media segments, comprising:

a physical support for supporting electronic circuitry;

a memory for storing data packets to be transmitted on either said first or second network and for storing data packets received from either said first or second network;

a bridge circuit mounted on said physical support and comprising at least first and second network interface circuits coupled to said first and second networks, respectively, each said network having physical data transmission media, said first and second network interfaces for converting data packets to be transmitted on said first and/or second networks and retrieved from said memory into electrical signals to propagate on said physical data transmission media of said first and/or second networks, said first and second networks each coupling a plurality of computing machines together for data exchange, each said computing machine having a network address which is a source network address in a data packet when said computing machine is transmitting said data packet as electrical signals on either said first or second network and is a destination network address in a data packet when said computing machine is receiving said data packet as electrical signals from either first or second network, said first and second network interfaces also for receiving electrical signals transmitted by one or more of said computing machines via said physical data transmission media of said first or second networks and converting said electrical signals into data packets for storage in said memory, each said data packet having a source network address indicating the computing machine which transmitted said data packet and a destination network address indicating the computing machine for which said data packet is bound, said bridge circuit for selectively forwarding a data packet received from a computing machine coupled to said first network to a computing machine coupled to said second network via said second network interface if the destination network address of said data packet received from said computing machine coupled to said first network is the network address of a computing machine coupled to said second network or if said destination network address of the received data packet has not been previously recorded in said memory by said bridge means as the network address of a computing machine coupled to either of said first or second networks, and for selectively forwarding a data packet received from a computing machine coupled to said second network to a computing machine coupled to said first network via said first network interface if the destination network address of said data packet received from said computing machine coupled to said second network is the network address of a computing machine coupled to said first network or if said destination network address of the received data packet has not been previously recorded by said bridge means in said memory as the network address of a computing machine coupled to either of said first or second networks;

and wherein at least one of said network interface circuits includes a repeater mounted on said physical support and which has at least two ports each of which is coupled to a physical media segment forming part of the network coupled to said network interface circuit which includes said repeater, said repeater for receiving data packets at one or more of said ports and automatically retransmitting said data packets out on all other ports of said repeater regardless of the destination network address of any particular data packet being retransmitted; and a management circuit coupled to said bridge circuit, said repeater(s) and said network interface circuits, for receiving and carrying out management commands, and wherein said management circuit implements the Simplified Network Management Protocol defined in national standard RFC 1157 and the User Datagram Protocol defined in national standard RFC 768 as these protocols were defined and published by the IETF at the time this application was filed.

37. The apparatus of claim 36 wherein said management circuit further comprises means to implement the Transmission Control Protocol defined in national standard RFC 793, and the Telnet Service Protocol as defined in national standard RFC 854 as these protocols were defined and published by the IETF at the time this application was filed.

* * * * *